US007076248B2

(12) United States Patent
Amirijoo et al.

(10) Patent No.: US 7,076,248 B2
(45) Date of Patent: Jul. 11, 2006

(54) RECOVERY OF MOBILE STATION(S) IN CONNECTED MODE UPON RNC FAILURE

(75) Inventors: Shahrokh Amirijoo, Sollentuna (SE); Per Beming, Stockholm (SE); Joakim Karl Olof Bergström, Stockholm (SE); Pontus Wallentin, Ljungsbro (SE); Gert-Jan Van Lieshout, CG Apeldoorn (NL); Pär Gustavsson, Linkoping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 600 days.

(21) Appl. No.: 10/235,863

(22) Filed: Sep. 6, 2002

(65) Prior Publication Data

US 2003/0050097 A1 Mar. 13, 2003

Related U.S. Application Data

(60) Provisional application No. 60/317,970, filed on Sep. 10, 2001.

(51) Int. Cl.
*H04Q 7/20* (2006.01)

(52) U.S. Cl. .................................. 455/432.1; 455/435.1

(58) Field of Classification Search ............. 455/432.1, 455/435.1, 436, 438, 439, 560, 561; 370/310.2, 370/331

See application file for complete search history.

(56) References Cited

U.S. PATENT DOCUMENTS

| 6,104,929 | A  | * | 8/2000 | Josse et al. ................. 455/445 |
| 6,233,458 | B1 | * | 5/2001 | Haumont et al. ............ 455/445 |
| 6,751,748 | B1 | * | 6/2004 | Bush ............................. 714/4 |
| 2002/0064144 | A1 | * | 5/2002 | Einola et al. ................ 370/335 |
| 2002/0115438 | A1 | * | 8/2002 | D'Herbemont et al. ..... 455/435 |
| 2003/0013446 | A1 | * | 1/2003 | Haumont et al. ........... 455/436 |

FOREIGN PATENT DOCUMENTS

| EP | 1 235 450 A1 | 8/2002 |
| WO | 95/15665 | 6/1995 |
| WO | 00/64199 A2 | 10/2000 |
| WO | 01/35586 A1 | 5/2001 |
| WO | 01/62030 A1 | 8/2001 |

OTHER PUBLICATIONS

U.S. Appl. No. 09/852,915, filed May 11, 2001 entitled "Releasing Plural Radio Connection with Omnibus Release Message".
Tech. Spec., 3$^{rd}$ Generation Partnership Project: Tech. Spec. Group Radio Access Network; "UE Procedures in Idle Mode and Procedures for Cell Reselection in Connected Mode (Release 1999)", 3GPP TS 25.304, v3.6.0 (Mar. 2001).
3GPP TS 25.331, V3.6.0 (Mar. 2001), 3$^{rd}$ Generation Partnership Project; Tech. Spec. Group Radio Access Network; RRC Protocol Specification (Release 1999).
International Search Report mailed Jan. 20, 2003 in corresponding PCT application No. PCT/SE02/01626.

* cited by examiner

*Primary Examiner*—Nguyen T. Vo
(74) *Attorney, Agent, or Firm*—Nixon & Vanderhye, P.C.

(57) ABSTRACT

An enhanced radio network controller (RNC) node of a radio access network stores context information for a user equipment unit which is in a Connected Mode, and initiates a cell update-prompting message which is transmitted the user equipment unit. The stored context information is used by the context-enhanced radio network controller (RNC) node for addressing the cell update-prompting message to the user equipment unit. After the user equipment unit (which is in its Connected Mode) performs the prompted cell update procedure, such user equipment unit (UE) can be paged with a conventional paging message. The invention with its context-enhanced radio network controller (RNC) node is particularly suitable to user equipment units which are in a critical state of the Connected Mode, such as (for example) either a CELL_PCH state or a URA_PCH state of the Connected Mode.

55 Claims, 13 Drawing Sheets

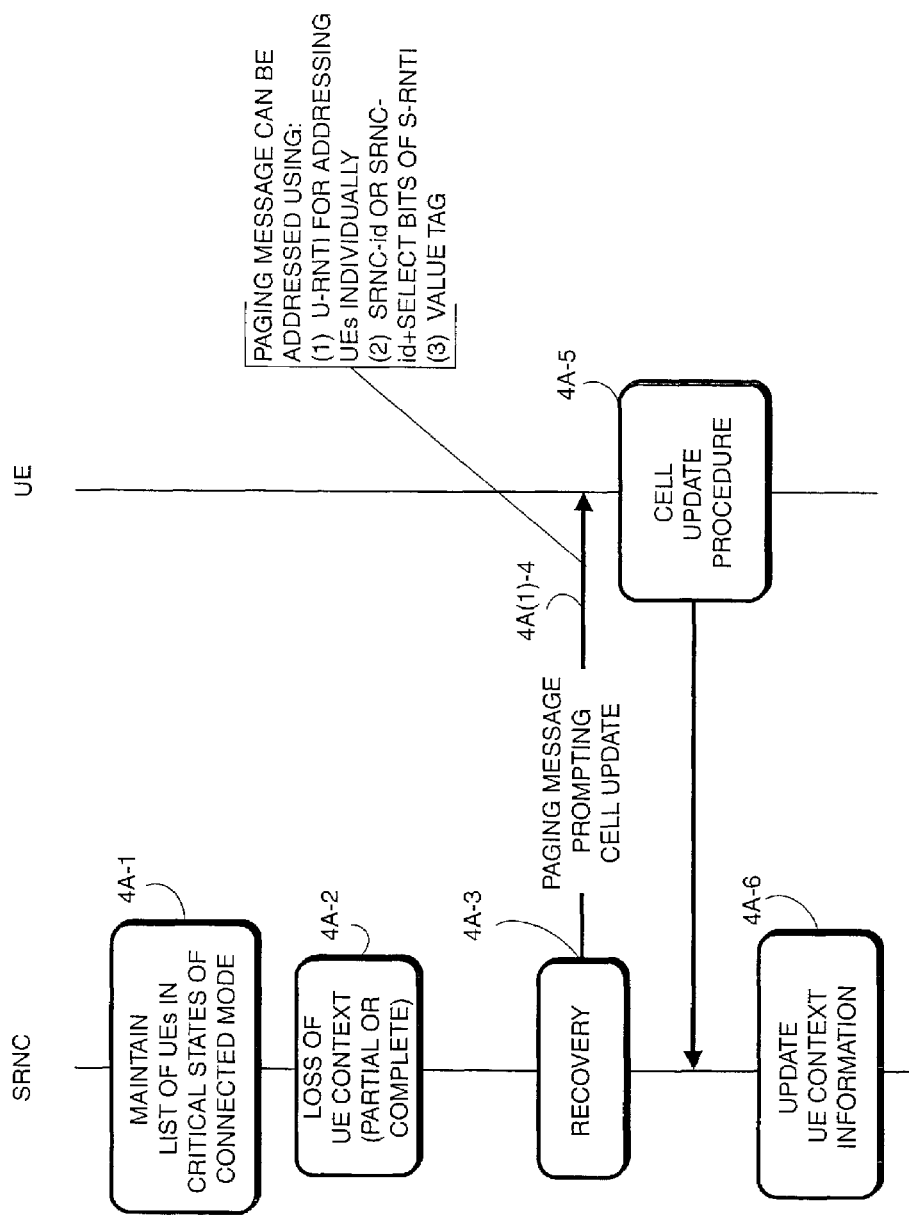
Fig. 4A(1)

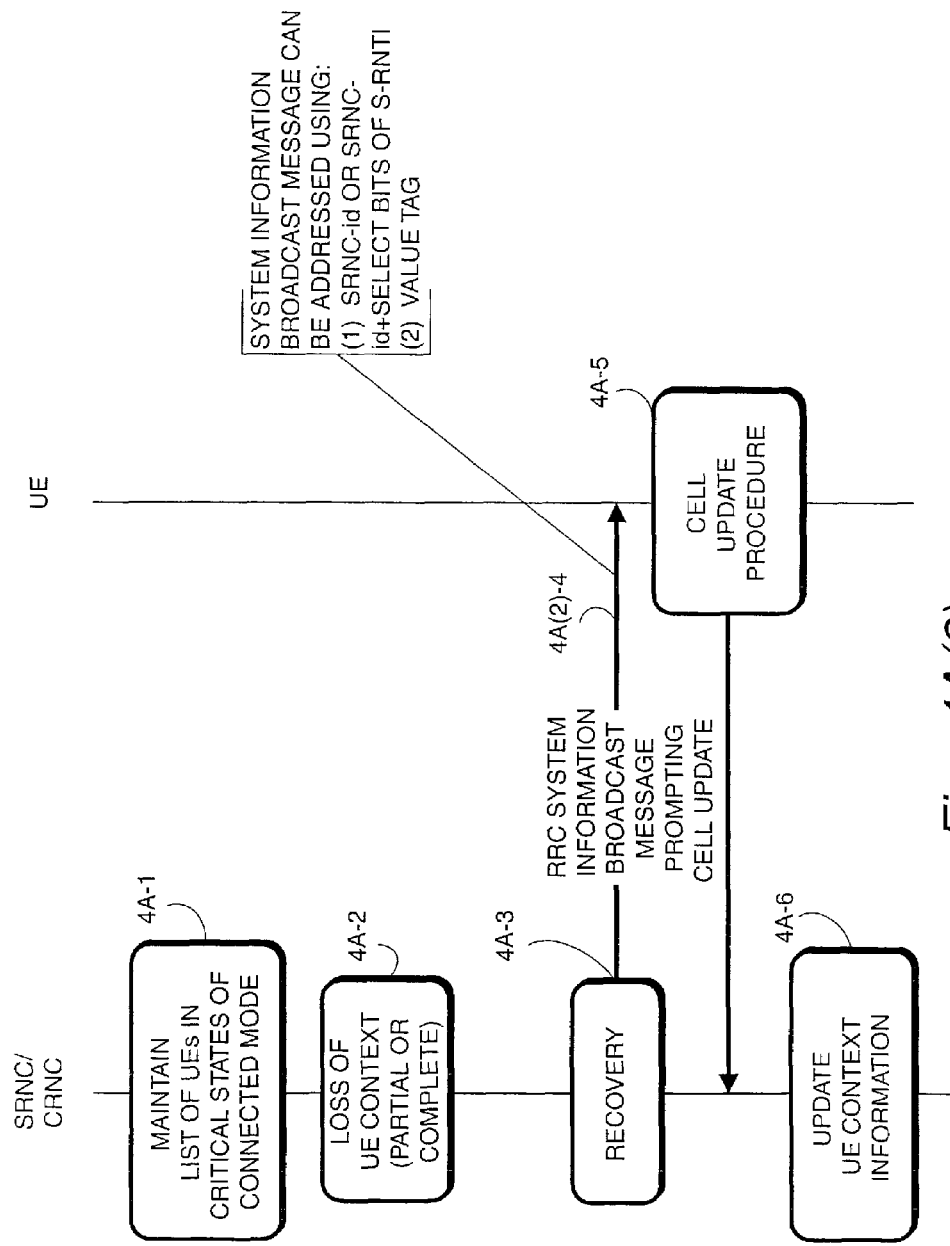
Fig. 4A(2)

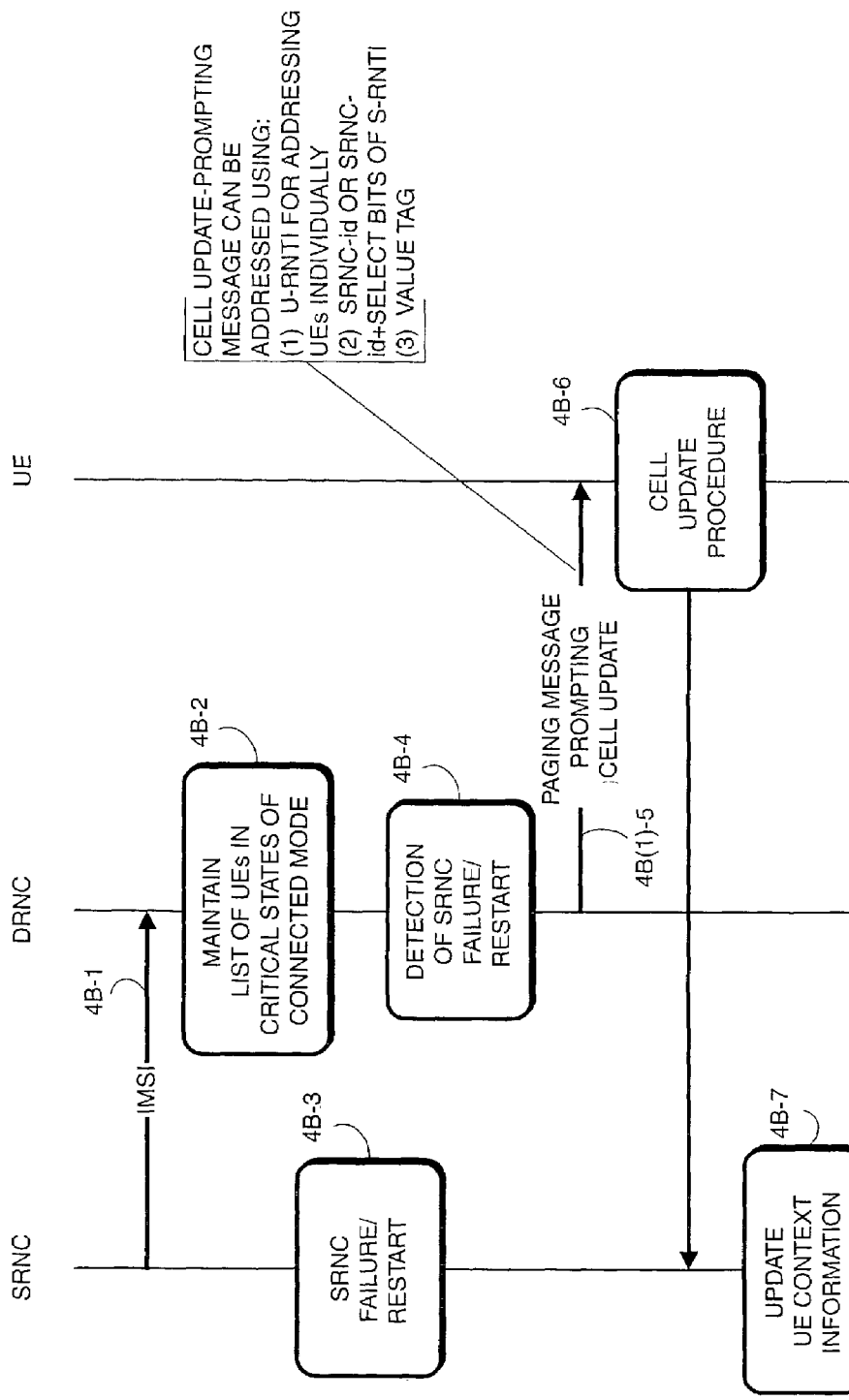
Fig. 4B(1)

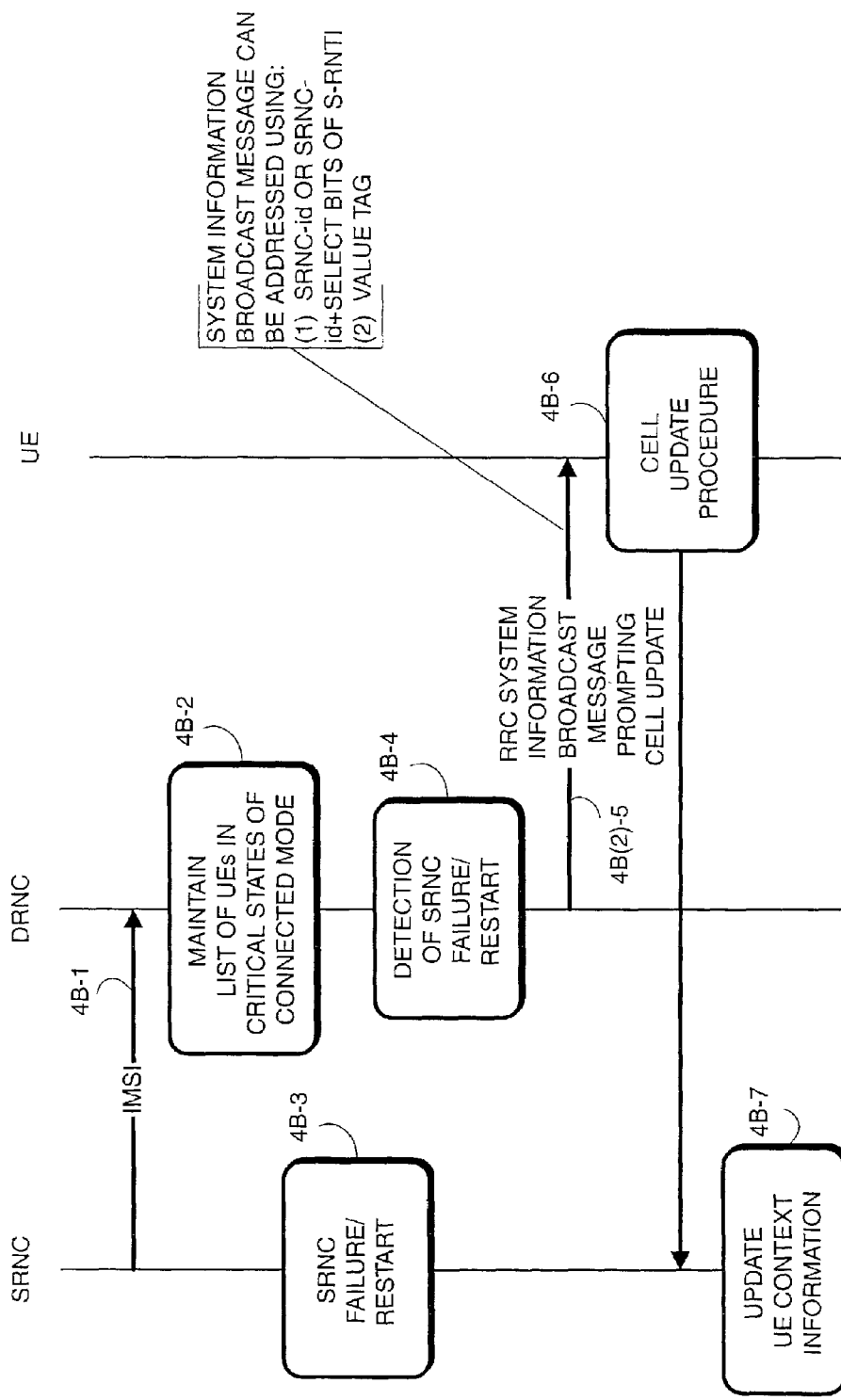

RECOVERY OF MOBILE STATION(S) IN CONNECTED MODE UPON RNC FAILURE

This application claims the priority and benefit of U.S. Provisional patent application No. 60/317,970, filed Sep. 10, 2001, which is incorporated herein by reference in its entirety. This application is related to U.S. patent application Ser. No. 09/852,915 filed May 11, 2001, entitled RELEASING PLURAL RADIO CONNECTION WITH OMNIBUS RELEASE MESSAGE, which is incorporated by reference herein in its entirety.

BACKGROUND

1. Field of the Invention

The present invention pertains to wireless telecommunications, and particularly to recovery when there has been a loss of certain information at a node of a radio access network that controls base stations.

2. Related Art and Other Considerations

In a typical cellular radio system, mobile user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

One example of a radio access network is the Universal Mobile Telecommunications (UMTS) Terrestrial Radio Access Network (UTRAN). The UMTS is a third generation system which in some respects builds upon the radio access technology known as Global System for Mobile communications (GSM) developed in Europe. UTRAN is essentially a radio access network providing wideband code division multiple access (WCDMA) to user equipment units (UEs). The Third Generation Partnership Project (3GPP) has undertaken to evolve further the UTRAN and GSM-based radio access network technologies.

As those skilled in the art appreciate, in W-CDMA technology a common frequency band allows simultaneous communication between a user equipment unit (UE) and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the user equipment units (UEs). Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a user equipment unit (UE) need not switch frequency when handoff of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover." In contrast to hard handover, soft handover is a "make-before-break" switching operation.

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface" or "Uu interface". In some instances, a connection involves both a Serving or Source RNC (SRNC) and a target or drift RNC (DRNC), with the SRNC controlling the connection but with one or more diversity legs of the connection being handling by the DRNC. An Inter-RNC transport link can be utilized for the transport of control and data signals between Source RNC and a Drift or Target RNC, and can be either a direct link or a logical link. An interface between radio network controllers (e.g., between a Serving RNC [SRNC] and a Drift RNC [DRNC]) is termed the "Iur" interface.

The radio network controller (RNC) controls the UTRAN. In fulfilling its control role, the RNC manages resources of the UTRAN. Such resources managed by the RNC include (among others) the downlink (DL) power transmitted by the base stations; the uplink (UL) interference perceived by the base stations; and the hardware situated at the base stations.

Those skilled in the art appreciate that, with respect to a certain RAN-UE connection, an RNC can either have the role of a serving RNC (SRNC) or the role of a drift RNC (DRNC). If an RNC is a serving RNC (SRNC), the RNC is in charge of the connection with the user equipment unit (UE), e.g., it has full control of the connection within the radio access network (RAN). A serving RNC (SRNC) is connected to the core network. On the other hand, if an RNC is a drift RNC (DRNC), its supports the serving RNC (SRNC) by supplying radio resources (within the cells controlled by the drift RNC (DRNC)) needed for a connection with the user equipment unit (UE). A system which includes the drift radio network controller (DRNC) and the base stations controlled over the Jub Interface by the drift radio network controller (DRNC) is herein referenced as a DRNC subsystem or DRNS. An RNC is said to be the Controlling RNC (CRNC) for the base stations connected to it by an Iub interface. This CRNC role is not UE specific. The CRNC is, among other things, responsible for handling radio resource management for the cells in the base stations connected to it by the Iub interface.

The UTRAN interfaces (Iu, Iur and Iub) have two planes, namely, a control plane (CP) and a user plane (UP). In order to control the UTRAN, the radio network application in the different nodes communicate by using the control plane protocols. The RANAP is a control plane protocol for the Iu interface; the RNSAP is a control plane protocol for the Iur interface; and NBAP is a control plane protocol for the Iub interface. The control plane protocols are transported over reliable signaling bearers. The transport of data received/ transmitted on the radio interface occurs in the user plane (UP). In the user plane, the data is transported over unreliable transport bearers. The serving radio network controller (SRNC) is responsible for establishing the necessary transport bearers between the serving radio network controller (SRNC) and the drift radio network controller (DRNC).

Operation of a user equipment unit (UE) is conceptualized from the perspective of radio resource control (RRC) as having two modes: an Idle Mode and a Connection Mode. FIG. 10 shows a state model relevant to a user equipment unit (UE) having these two modes. The Idle Mode is entered after power on. In Idle Mode there is no connection between the user equipment unit (UE) and the UTRAN. When a connection is established, the user equipment unit (UE) is assigned a U-RNTI and the user equipment unit (UE) enters Connected Mode. The U-RNTI (UTRAN Radio Network Temporary Identity) is a global identity, which can be used in any cell in the UTRAN.

Within Connected Mode there are four different states: CELL_DCH state; CELL_FACH state; CELL_PCH state; and URA_PCH . As briefly described below, each state reflects a different level of activity.

The CELL_DCH state is characterized by that there is a dedicated channel (DCH) assigned to the user equipment unit (UE). Macro-diversity may be used between DCHs of several cells. In the CELL_DCH state, there is a dedicated control channel (DCCH) used for transmission of signalling messages between the user equipment unit (UE) and the UTRAN.

In the CELL_FACH state, no dedicated physical channel is assigned, but the user equipment unit (UE) listens continuously to a common channel (the FACH) in the downlink belonging to the selected cell. In the uplink, the user equipment unit (UE) typically uses a random access channel (RACH). At each cell reselection, the user equipment unit (UE) updates the network with its current cell location. In this state, there is a dedicated control channel (DCCH) used for transmission of signalling messages between the user equipment unit (UE) and the UTRAN. The DCCH is implemented by appending the Radio Network Temporary Identity (U-RNTI or C-RNTI) to all signalling messages, and thus addressing an individual UE. As mentioned previously, the U-RNTI (UTRAN RNTI) is a global identity, which can be used in any cell in the UTRAN. The C-RNTI (Cell RNTI) is only significant in a single cell, and has to be reallocated in every cell. On the other hand, C-RNTI is much shorter than the U-RNTI which saves space over the radio interface when it is used. There is also a CCCH (Common control channel) in this state, which is used when the connection to the SRNC is not available, such at after cell reselection over RNC borders, when the CELL UPDATE or URA UPDATE message is sent to the DRNC.

In the CELL_PCH state, the user equipment unit (UE) monitors a paging channel (PCH) of a selected cell. On the PCH, the user equipment unit (UE) uses discontinuous reception (DRX) to save power, and the scheme for when to listen is agreed between the network and the user-equipment unit (UE) on a per user equipment unit (UE) basis. Also in the CELL_PCH state the user equipment unit (UE) updates the network with its current cell location at cell reselection. No DCCH is available in the CELL_PCH state. On the PCH, means for addressing individual user equipment units (UEs) exist (using the U-RNTI), but the user equipment unit (UE) can not transport any signalling messages to the network.

The URA_PCH state is almost identical to the CELL_PCH state. The difference is that the user equipment unit (UE) does only update the network of its location after crossing URA borders. An URA (UTRAN Registration Area) is a group of cells. This means that in this state the position of the user equipment unit (UE) is in general known only on URA level.

The user equipment units (UEs) in the states CELL_PCH and URA_PCH of the RRC Connected Mode listen to the RRC Page type 1 (see, 3GPP TS 25.331, RRC Protocol Specification). In the RRC Page type 1, the paged UE is addressed by the UTRAN Identity (U-RNTI). As shown by FIG. 11, the U-RNTI actually comprises two portions, particularly a twelve bit SRNC-id information element portion and a twenty bit S-RNTI information element portion. The SRNC-id information element is typically an identifier of the SRNC which serves the user equipment unit (UE). The S-RNTI information element is a number allocated by that SRNC for distinguishing the user equipment unit (UE) within that SRNC.

When a user equipment unit (UE) is in the Idle mode, on the other hand, the CN Identity (TMSI) is used for paging. The TMSI (temporary mobile station identifier) is typically assigned to a user equipment unit (UE) while the user equipment unit (UE) is in a certain multicell area. Unfortunately, the CN Identity (TMSI) can not be used for paging when the user equipment unit (UE) is in the states CELL_PCH and URA_PCH of the RRC Connected Mode. This is because the CN Identity (TMSI) is only valid in the Location Area where the user equipment unit (UE) first established the RRC Connection and performed Location Update. After connection establishment and Location Update, if the user equipment unit (UE) being in the Connected Mode moves to another Location Area (LA), no further Location Update procedure occurs (since a Location Update procedure is not performed while the user equipment unit (UE) is in its Connected Mode). Therefore, in the Connected Mode the UTRAN Identity (U-RNTI) is used for paging the user equipment unit (UE) instead of the CN Identity (TMSI).

Unfortunately, after a failure of a radio network controller (RNC) node, some relevant information about the user equipment units that are connected to the RNC is lost. This will result in those user equipment units not being reached by the UTRAN. For instance, if the lost information includes the U-RNTI of a user equipment unit in the connected mode, paging of that user equipment unit is not possible. This will result in the user equipment unit being a "hanging UE" until the user equipment unit next performs a location update (e.g., either a periodic cell update or a periodic URA update). Such periodic updates (either the periodic cell update or the periodic URA update) are prompted by expiration of appropriate timers, e.g., a periodic cell update timer or a periodic URA update timer. However, the expiration times of these timers are typically quite long, on the order of thirty minutes to an hour. Until performance of either the periodic cell update or the periodic URA update, as appropriate, the affected 30 user equipment unit cannot be reached. While one remedial measure might be to decrease the expiration time of the timers, such decrease would result in a corresponding undesirable increased signaling load (due to increased periodic updates) during the normal operation.

After such RNC failure, there can be paging initiated by the Core Network (CN) and sent by UTRAN over the Uu interface (e.g., radio interface), but such paging will be addressed using the CN Identity (TMSI). However, user equipment units (UEs) in the CELL_PCH and URA_PCH states will simply disregard such attempted paging.

Thus, in the case of the partial loss of the user equipment unit (UE) context (that is, the UE context information (U-RNTI) is lost for some user equipment units) the user equipment units for which the UE context has been lost will themselves essentially be lost and can not be paged. For those user equipment units, in the current radio access network schemes there is no possibility of regaining the user equipment units, but rather only the drastic measures of turning off the transmission in the cells or barring the cells. Such drastic measures can, in turn, negatively affect other user equipment units whose context information was not lost.

The aforementioned problem arises in several situations. For example, the problems arises when the SRNC and CRNC are one and the same. The problem can also arise when the serving RNC (SRNC) is not the controlling RNC of the cells where the user equipment unit (UE) is currently located, i.e. the user equipment unit is connected to SRNC via Iur interface. In the case of the SRNC reset, there is no mechanism to inform the user equipment units in these states that the SRNC is not reachable anymore or their contexts need to be updated.

What is needed, therefore, and an object of the present invention, is a technique for recovering the otherwise lost (e.g., hanging) user equipment units in certain critical states of the Connected Mode after loss of the context information (e.g., U-RNTI) of user equipment unit, as can occur after an RNC failure.

BRIEF SUMMARY

An enhanced radio network controller (RNC) node of a radio access network stores context information for a user equipment unit which is in a Connected Mode, and initiates a cell update-prompting message which is transmitted the user equipment unit. The stored context information is used by the context-enhanced radio network controller (RNC) node for addressing the cell update-prompting message to the user equipment unit. After the user equipment unit (which is in its Connected Mode) performs the prompted cell update procedure, such user equipment unit (UE) can be paged with a conventional paging message. The invention with its context-enhanced radio network controller (RNC) node is particularly suitable to user equipment units which are in a critical state of the Connected Mode, such as (for example) either a CELL_PCH state or a URA_PCH state of the Connected Mode.

Storage of the UE context information and initiation of the cell update-prompting message by the context-enhanced radio network controller (RNC) node is particularly advantageous upon failure and reset of a radio network controller (RNC) node of a radio access network. Such failure typically involves at least partial loss, at the failing radio network controller (RNC) node, of context information for a user equipment unit (e.g., UTRAN Radio Network Temporary Identity (U-RNTI) for the user equipment unit).

In one mode of the invention, the failing RNC node is the context-enhanced radio network controller (RNC) node which serves both as a Serving RNC node and CRNC node for cell in which the user equipment unit resides. In this first mode, the CRNC/SRNC node has a RNC recovery unit which maintains a list of user equipment units in a critical state of their Connected Mode. After its failure and reset, the CRNC/SRNC sends the cell update-prompting message to the user equipment unit (which is in a cell controlled by the CRNC/SRNC).

In a second mode of the invention, the failing RNC node is a Serving RNC node for which the context-enhanced RNC node serves as a drift RNC node (DRNC). In accordance with this second mode of the invention, when a radio network controller (RNC) node which suffers the loss of context information for a user equipment unit serves as the SRNC node, but the cell resources for the connection are controlled by a drift RNC (DRNC), a SRNC recovery unit of the context-enhanced DRNC node maintains a list of user equipment units in a critical state of their Connected Mode. After reset of the SRNC node, the DRNC node initiates transmission of the cell update-prompting message to the user equipment unit.

The cell update-prompting message can take various forms. For example, as one aspect the cell update-prompting message can be a paging message. As another aspect, the cell update-prompting message can be a radio resource control (RRC) system information broadcast message.

The manner of transmission/broadcast of the cell update-prompting message can also vary. For example, the cell update-prompting message can be transmitted individually to plural user equipment units in a critical state of their Connected Mode. In order to know when to transmit the cell update-prompting message to a particular user equipment unit, the context-enhanced RNC also stores the international mobile subscriber identity (IMSI) of the user equipment unit in its Connected Mode. The IMSI is utilized by the context-enhanced RNC to determine a paging occasion for the user equipment unit, e.g., to determine a point in time at which the user equipment unit will be listening to a paging channel. In order for a context-enhanced DRNC to obtain the IMSI for a user equipment unit on its list, the SRNC transmits to the DNRC the IMSI for a user equipment unit which is in a critical state of its Connected Mode. Such transmission of the IMSI from the SRNC to the DRNC can occur, for example, using a Downlink (DL) Signalling Transfer Message.

Alternatively, the cell update-prompting message can be transmitted collectively to plural user equipment units a critical state of their Connected Mode. The plural user equipment units to which the cell update-prompting message pertains can be addressed using the SRNC identity of the failed RNC, or a group address associated with the plural user equipment units. Such group address can be formed, for example, using the SRNC identity of the failed SRNC and selected bits of a S-RNTI information element.

When the cell update-prompting message is repetitively transmitted to at least some of the plural user equipment units in a critical state of their Connected Mode, as one aspect of the invention the cell update-prompting message can include a field which facilitates a user equipment unit performing its cell update only once despite possible plural receptions by the user equipment unit of the cell update-prompting message. For example, the field can comprise a value tag or counter. After the user equipment unit has been addressed by the cell update-prompting message containing a certain value for the counter and has performed its cell update, the user equipment unit does not respond (e.g., does not perform any further cell updates) to further transmissions of the cell update-prompting message in which the value tag or counter is unchanged.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 4A(1) and FIG. 4A(2) are diagrammatic views illustrating employment of particular messages in conjunction with the first mode of FIG. 1A.

FIG. 4B(1) and FIG. 4B(2) are diagrammatic views illustrating employment of particular messages in conjunction with the second mode of FIG. 1B.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1A:
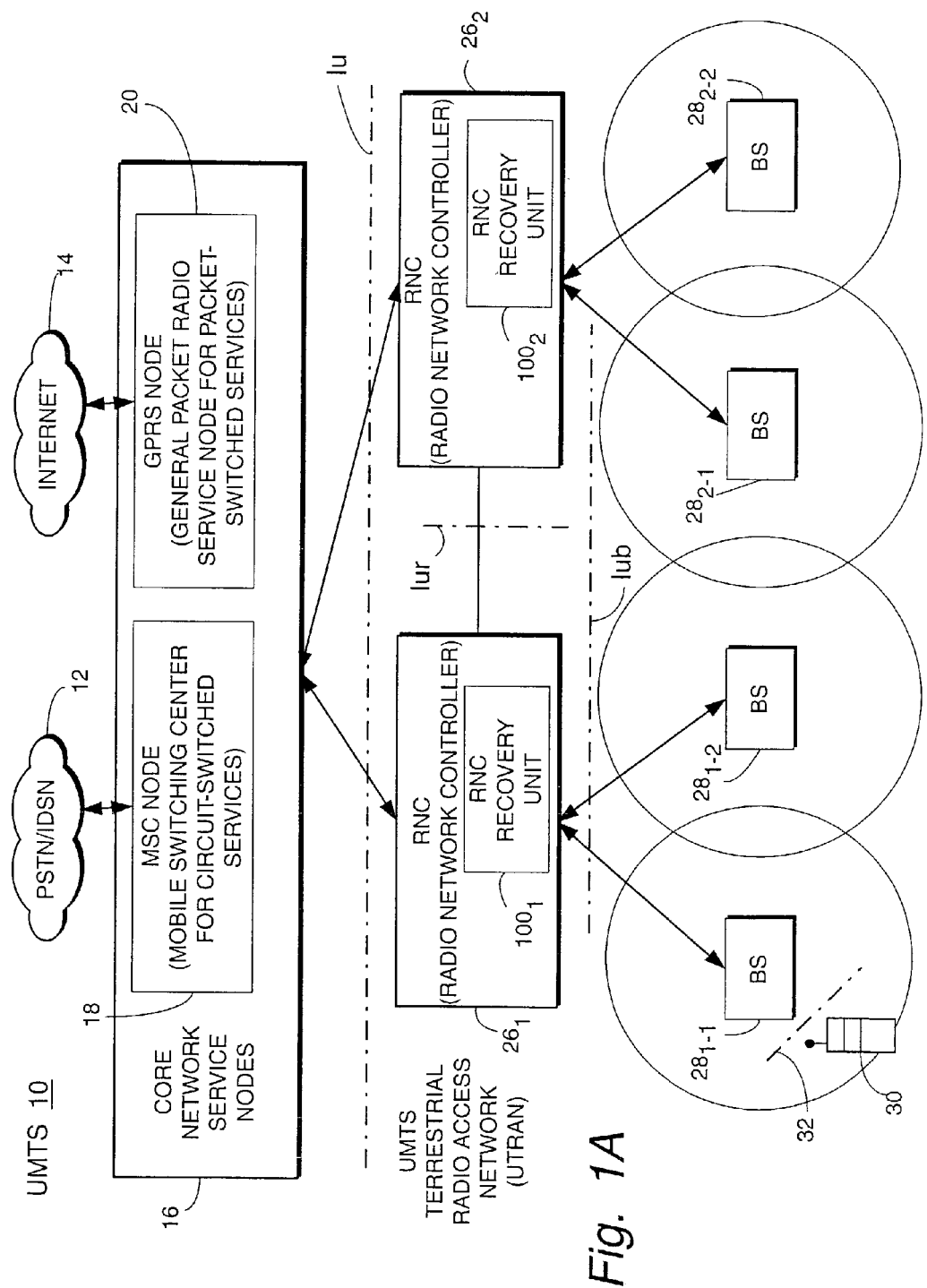
FIG. 1A is diagrammatic view of an example embodiment of a mobile 10 communications system which is advantageous for implementing a first mode of the present invention.

A first mode of the present invention is described in the non-limiting, example context of a universal mobile telecommunications (UMTS) 10 shown in FIG. 1A. A representative, connection-oriented, external core network, shown as a cloud 12 may be for example the Public Switched Telephone Network (PSTN) and/or the Integrated Services Digital Network (ISDN). A representative, connectionless external core network shown as a cloud 14, may be for example the Internet. Both core networks are coupled to their corresponding service nodes 16. The PSTN/ISDN connection-oriented network 12 is connected to a connection-oriented service node shown as a Mobile Switching Center (MSC) node 18 that provides circuit-switched services. The Internet connectionless-oriented network 14 is connected to a General Packet Radio Service is (GPRS) node 20 tailored to provide packet-switched type services which is sometimes referred to as the serving GPRS service node (SGSN).

Each of the core network service nodes 18 and 20 connects to a UMTS Terrestrial Radio Access Network (UTRAN) 24 over a radio access network (RAN) interface referred to as the Iu interface. UTRAN 24 includes one or more radio network controllers (RNCs) 26. For sake of simplicity, the UTRAN 24 of FIG. 1A is shown with only two RNC nodes, particularly RNC $26_1$ and RNC $26_2$. Each RNC 26 is connected to a plurality of base stations (BS) 28. For example, and again for sake of simplicity, two base station nodes are shown connected to each RNC 26. In this regard, RNC $26_1$ serves base station $28_{1-1}$ and base station $28_{1-2}$, while RNC $26_2$ serves base station $28_{2-1}$ and base station $28_{2-2}$. It will be appreciated that a different number of base stations can be served by each RNC, and that RNCs need not serve the same number of base stations. Moreover, FIG. 1A shows that an RNC can be connected over an Iur interface to one or more other RNCs in the URAN 24. Further, those skilled in the art will also appreciate that a base station is sometimes also referred to in the art as a radio base station, a node B, or B-node.

In the illustrated embodiments, for sake of simplicity each base station 28 is shown as serving one cell. Each cell is represented by a circle which surrounds the respective base station. It will be appreciated by those skilled in the art, however, that a base station may serve for communicating across the air interface for more than one cell. For example, two cells may utilize resources situated at the same base station site.

A user equipment unit (UE), such as user equipment unit (UE) 30 shown in FIG. 1A, communicates with one or more cells or one or more base stations (BS) 28 over a radio or air interface 32. Each of the radio interface 32, the Iu interface, the Iub interface, and the Iur interface are shown by dash-dotted lines in FIG. 1A.

Preferably, radio access is based upon Wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality.

In cell_DCH state, each user mobile station or equipment unit (UE) 30 is assigned its own scrambling code in order for a base station 28 to identify transmissions from that particular user equipment unit (UE) as well as for the user equipment unit (UE) to identify transmissions from the base station intended for that user equipment unit (UE) from all of the other transmissions and noise present in the same area.

Different types of channels may exist between one of the base stations 28 and user equipment units (UEs) 30 for transport of control and user data. For example, in the forward or downlink direction, there are several types of broadcast channels including a general broadcast channel (BCH), a paging channel (PCH), a common pilot channel (CPICH), and a forward access channel (FACH) for providing various other types of control messages to user equipment units (UEs). The forward access channel (FACH) is also used to carry user data. In the reverse or uplink direction, a random access channel (RACH) is employed by user equipment units (UEs) whenever access is desired to perform location registration, call origination, page response, and other types of access operations. The random access channel (RACH) is also used for carrying certain user data, e.g., best effort packet data for, e.g., web browser applications. Dedicated channels (DCH) may be allocated to carry substantive call communications with a user equipment unit (UE). As set up by the control channels, traffic channels (TCH) are allocated to carry substantive call communications with a user equipment unit (UE). Some of the traffic channels can be common traffic channels, while others of the traffic channels can be dedicated traffic channels (DCHs).

Figure 2:
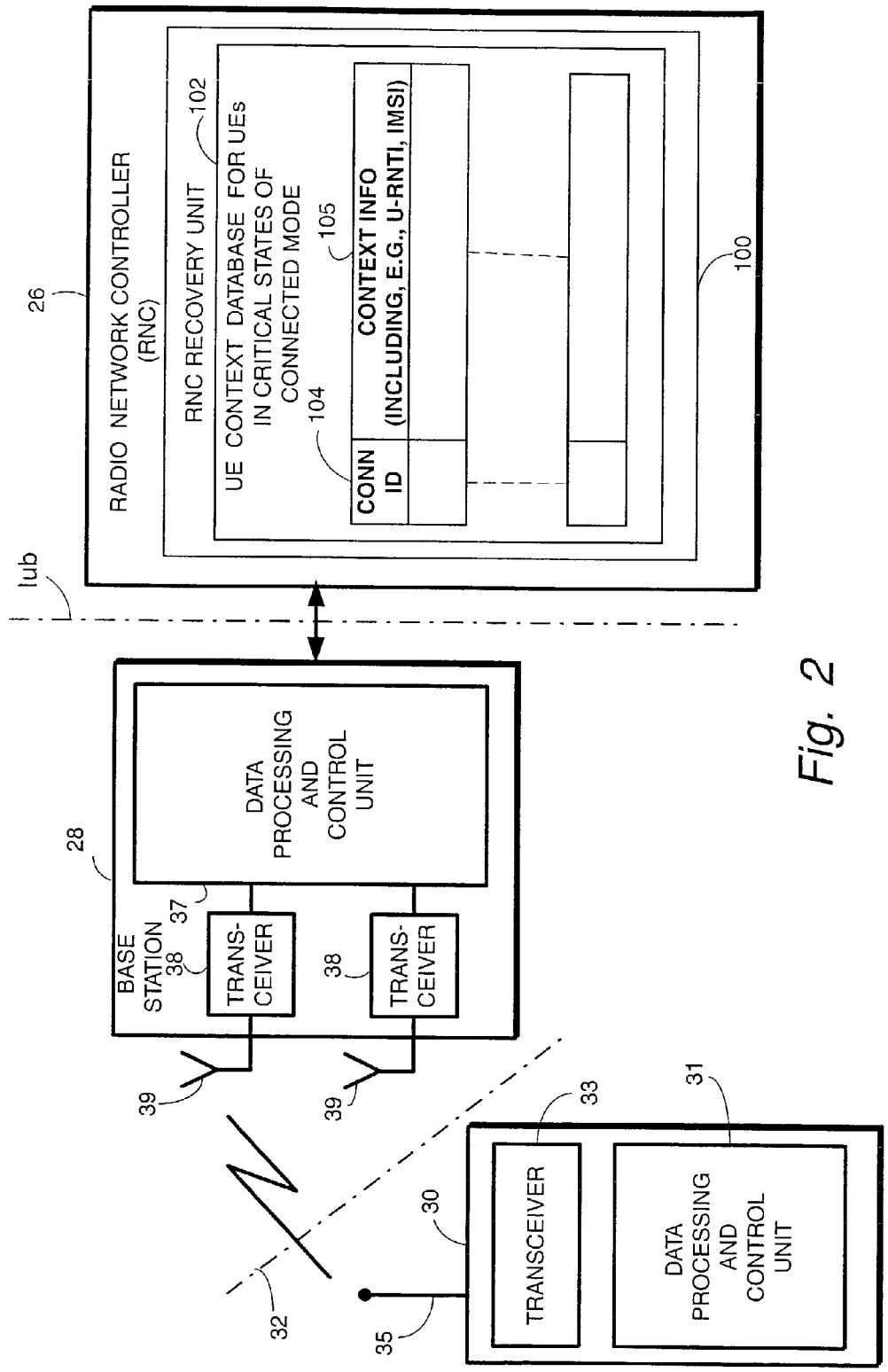
FIG. 2 is a simplified function block diagram of a portion of a UMTS Terrestrial Radio Access Network, including a user equipment unit (UE) station; a radio network controller; and a base station.

FIG. 2 shows selected general aspects of user equipment unit (UE) 30 and illustrative nodes such as radio network controller 26 and base station 28. The user equipment unit (UE) 30 shown in FIG. 2 includes a data processing and control unit 31 for controlling various operations required by the user equipment unit (UE). The UE's data processing and control unit 31 provides control signals as well as data to a radio transceiver 33 connected to an antenna 35.

The example radio network controller 26 and base station 28 as shown in FIG. 2 are radio network nodes that each include a corresponding data processing and control unit 36 and 37, respectively, for performing numerous radio and data processing operations required to conduct communications between the RNC 26 and the user equipment units (UEs) 30. Part of the equipment controlled by the base station data processing and control unit 37 includes plural radio transceivers 38 connected to one or more antennas 39.

In modes of the present invention, a radio network controller includes a special unit which stores context information (e.g., "UE context information" or "UE context") for a user equipment unit which is in a Connected Mode, and which, at certain junctures, causes or initiates transmission of a cell update-prompting message to such user equipment unit. The radio network controller which has such special unit, or which otherwise provides the advantages of the present invention, is sometimes referred to herein as a "context-enhanced" or "enhanced" radio network controller or RNC node. As will become apparent, storage of the context information and initiation of the cell update-prompting message is particularly suited for user equipment units which are in a critical state of its Connected Mode (e.g., in either the CELL_PCH state or the URA_PCH state of the Connected Mode, for example).

A significant juncture or event which gives rise to performance of the special unit or enhanced RNC functionality mentioned above is failure and subsequent reset of a radio network controller of a radio access network. In a first mode of the invention, described below primarily in conjunction with FIG. 1A and FIG. 4A, the failing RNC node is the context-enhanced radio network controller (RNC) node itself, which serves both as a Serving RNC node and CRNC node for cell in which the user equipment unit resides. In a second mode of the invention, described below primarily in conjunction with FIG. 1A and FIG. 4A, the failing RNC node is a Serving RNC node for which the context-enhanced RNC node serves as a drift RNC node (DRNC).

In the first mode of the invention as illustrated in FIG. 1A, the special unit referenced above is shown as a RNC recovery unit. To this end, in FIG. 1A the radio network controller (RNC) 26$_1$ has a RNC recovery unit 100$_1$ and the radio network controller (RNC) 26$_2$ has a RNC recovery unit 100$_2$. The mode shown in FIG. 1A is particularly applicable when the RNC which experiences the significant juncture or event serves as both the CRNC and SRNC for the connection involving the user equipment unit (UE) 30. In FIG. 1A, for example, radio network controller 26$_1$ is controlling the base station 28$_{1-1}$ for the cell in which user equipment unit (UE) 30 is current situated.

As seen in FIG. 2, the RNC recovery unit 100 for a RNC nodes maintains a UE context database 102 for user equipment units in a critical state (e.g., the CELL_PCH state or the URA_PCH state) of the Connected Mode. The UE context database 102 can be conceptualized as a table having a row for each connection involving a user equipment unit in a critical state (e.g., the CELL_PCH state or the URA_PCH state). In each row of the table of UE context database 102, there are a series of fields (shown as columns in UE context database 102) including a field 104 which serves as a connection identifier for the connection, and a field 105 in which is stored the context information for the user equipment unit (UE).

The content of "context Information" for a user equipment unit, i.e., the UE context, is known to those skilled in the art. The international mobile subscriber identity (IMSI) is ultimately received at a SNRC node from the core network (CN) in a RANAP COMMON ID message when a radio resource control (RRC) connection is setup. The international mobile subscriber identity (IMSI) [which comprises not more than fifteen digits] comprises three components: a mobile country code (MCC); a mobile network code (MNC); and a mobile subscriber identification number (MSIN). Usage of the IMSI in conjunction with determining paging occasions for individual user equipment units is subsequently described.

When the enhanced radio network controller (RNC) is a SRNC, the context information further includes, among others, the following parameters: C-ID, D-RNTI, and RNC Identity of the DRNC where the user equipment unit (UE) is currently located. The D-RNTI parameter is similar to S-RNTI parameter, but identifies the UE context information in the DRNC. The C-ID parameter is the Cell Identity of where the UE is currently located. The C-ID parameter is not applicable to the UEs in the URA_PCH state, since the location of a user equipment unit (UE) in the URA_PCH state is not known to the cell level, but rather is known on URA level (a group of cells defined as one URA). With regard to the RNC Identity parameter, it is noted that in the Cell_DCH state there could be many simultaneous radio links (RLs), so there could conceivably be as many RNCs (at least theoretically) handling legs of connections to the UE. When the enhanced radio network controller (RNC) is a SRNC, the entries in the UE context datebase 102 can be sorted or arranged by the S-RNTI (which can be included, for example, in the first field of a row).

The UE context database 102 can be formatted or grouped by critical state, e.g., with a first subdivision of the UE context database 102 comprising user equipment units in the CELL_PCH state and a second subdivision of the UE context database 102 comprising user equipment units in the URA_PCH state. Alternatively, an additional field can be provided for each row to indicate the particular critical state for the user equipment unit (e.g., the CELL_PCH state or the URA_PCH state).

Figure 4A:
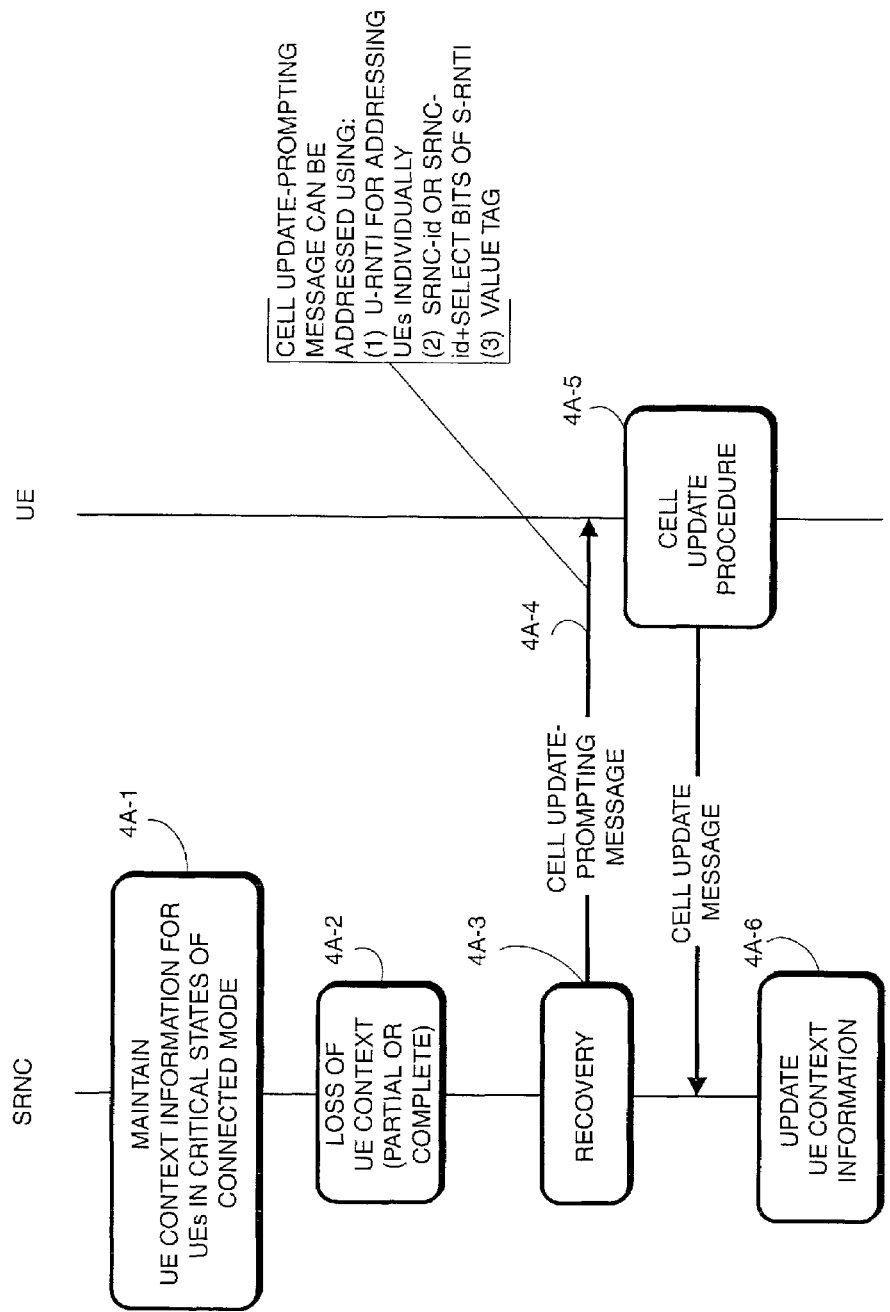
FIG. 4A is a diagrammatic view of certain messages and events performed in conjunction with the first mode of FIG. 1A.

FIG. 4A shows certain basic example messages and events performed in conjunction with the first mode of FIG. 1A. Event 4A-1 shows the RNC recovery unit 100 of the RNC, e.g., radio network controller (RNC) $26_1$ in FIG. 1A, maintaining the UE context information for user equipment units in a critical state of the Connected Mode for which the RNC controls the radio connection. As explained above, such UE context information is maintained via UE context database 102, which includes a list of user equipment units in a critical state of the Connected Mode for which the RNC controls the radio connection.

Event 4A-2 depicts a loss of context for at least some of the user equipment units having radio connections controlled by the radio network controller (RNC) which has the RNC recovery unit 100, e.g., radio network controller (RNC) $26_1$. The loss of context can be a partial loss or a complete loss of UE context. Such loss of context as depicted by event 4A-2 typically means loss of the U-RNTI for one or more of the user equipment units, and generally occurs during failure of the RNC node. Assuming that the failure is detected, as part of a recovery operation (event 4A-3) the recovering RNC obtains the UE context information for the failure-affected user equipment units from its UE context database 102. Recovery of the UE context information is possible since UE context database 102 is maintained in involatile memory or is otherwise recoverable after the failure of the SRNC. As event 4A-4, the RNC initiates transmission of the cell update-prompting message to the affected user equipment unit (UE) 30. It is the UE context information (e.g., U-RNTIs) for the failure-affected user equipment units that is used to address the cell update-prompting message to the failure-affected user equipment units.

Upon receipt of the cell update-prompting message of event 4A-4, as event 4A-5 the user equipment unit (UE) initiates a cell update procedure. When the user equipment unit (UE) is in the CELL_PCH state, the cell update procedure is a cell update procedure. An example cell update procedure is described in 3GPP TS 25.331, RRC Protocol Specification, subclause 8.3.1. On the other hand, when the user equipment unit (UE) is in the URA_PCH state, the cell update procedure is a URA update procedure. Upon completion of the cell update procedure (e.g., event 4A-5), the RNC as event 4A-6 updates the UE context for the user equipment unit in its database. The cell update-prompting message can take various forms. FIG. 4A(1) and FIG. 4A(2) specifically illustrate examples of particular message types in conjunction with the first mode of FIG. 1A and FIG. 4A. For example, FIG. 4A(1) shows that the cell update-prompting message of event 4A-4 can take the form of a paging message (see event 4A(1)–4 in FIG. 4A(1)). FIG. 4A(2) shows that the cell update-prompting message of event 4A-4 can, as an alternative, take the form of a radio resource control (RRC) system information broadcast message (see event 4A(2)–4 in FIG. 4A(2)). The radio resource control (RRC) system information broadcast message scenario of FIG. 4A(2) can only be used when the SRNC also serves as the CRNC. FIG. 4A(2) shows a SRNC/CRNC sending the radio resource control (RRC) system information broadcast message because the SRNC can only send such message (the system information broadcast message) in its own cells, i.e. in the cells for which it is the controlling RNC (CRNC) and not the cells that are controlled by another RNC (DRNC).

Although not specifically illustrated as such, it should be understood with respect to the embodiments of FIG. 4A and 4A(1) that the paging/cell-Update prompting message may be sent via other DRNCs in the FIG. 4A and 4A(1). Currently, in the 3GPP specification (25.423), the paging to user equipment units (UEs) in other RNCs (DRNC) is set via Iur to these DRNCs which is forwarded to the user equipment units (UE)s.

Figure 1B:
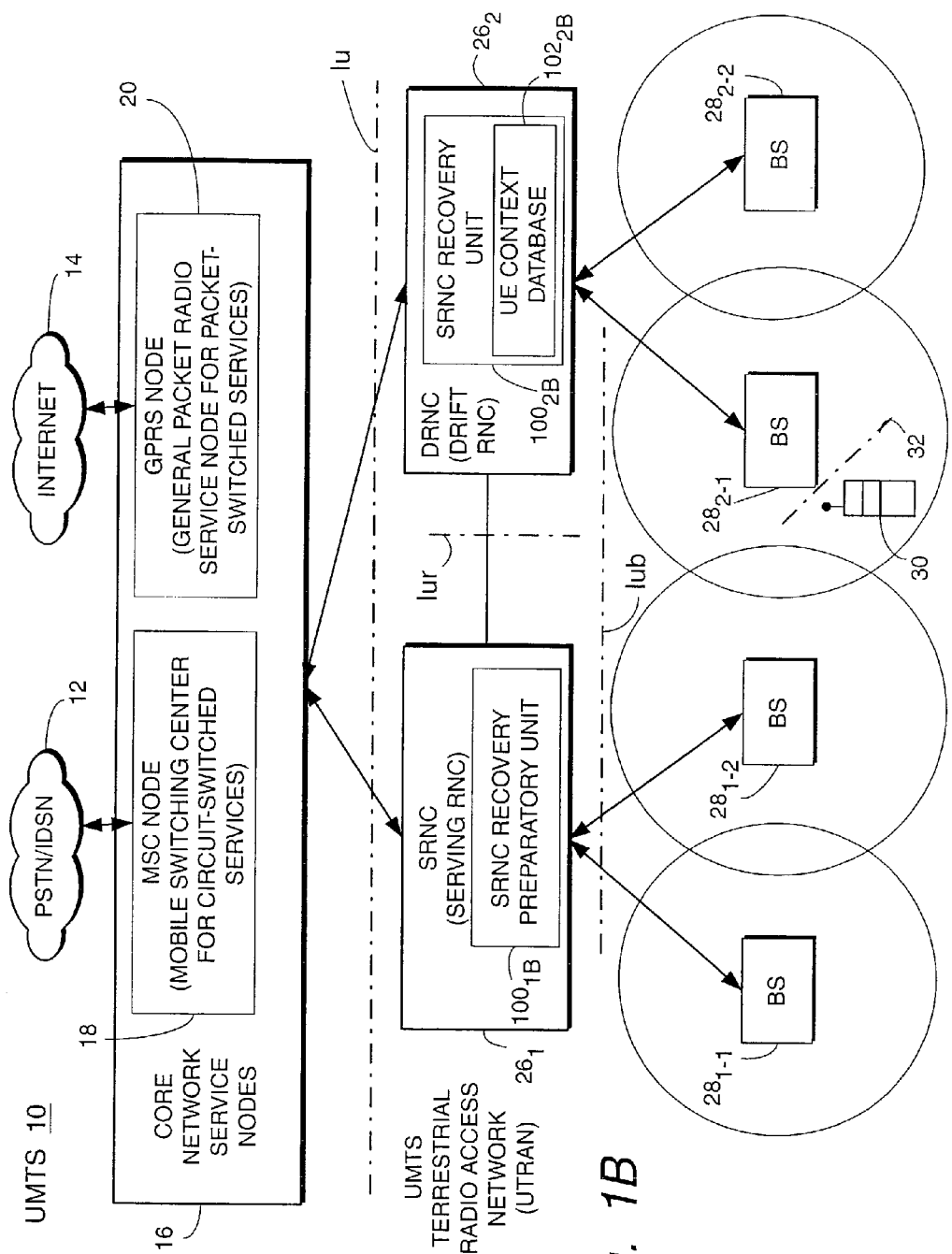
FIG. 1B is diagrammatic view of an example embodiment of a mobile communications system which is advantageous for implementing a second mode of the present invention.
Figure 4B:
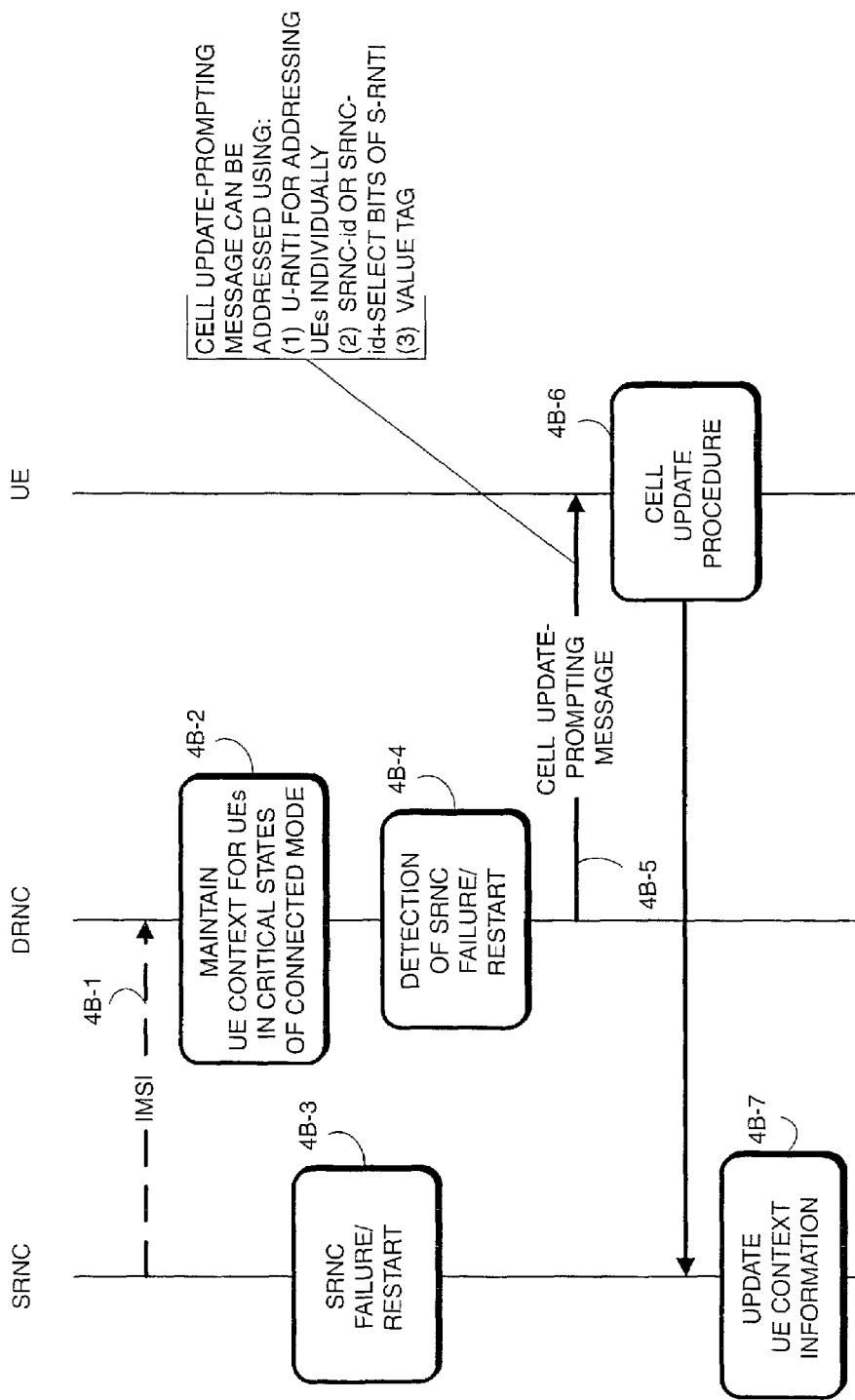
FIG. 4B is a diagrammatic view of certain messages and events performed in conjunction with the second mode of FIG. 1B.

FIG. 1B together with FIG. 4B show a second example mode of the invention. The second mode of FIG. 1B/FIG. 4B essentially resembles that of the first mode of FIG. 1A/FIG. 4A, for which reason aspects of the second mode which are essentially the same as the first mode are depicted in FIG. 1B using the same reference numerals employed in FIG. 1A. In the second mode of FIG. 1B, however, the radio network controller (RNC) $26_1$ serves as a Serving RNC (SRNC) for a connection involving user equipment unit (UE) 30, while the radio network controller (RNC) $26_2$ serves as the Drift RNC (DRNC) since radio network controller (RNC) $26_2$ controls the cell involved in a leg of the connection with user equipment unit (UE) 30. In the second mode of FIG. 1B, the radio network controller (RNC) $26_1$ has a SRNC recovery preparatory unit $100_{1B}$. Moreover, in the second mode the DRNC $26_2$ has a SRNC recovery unit $100_2$.

In the second mode of FIG. 1B, the radio network controller (RNC) node which suffers the loss of context information for a user equipment unit serves as the SRNC node (e.g., radio network controller (RNC) $26_1$). Although the connection itself is controlled by the SNRC, the cell resources for the connection are controlled by a drift RNC (DRNC) [e.g., radio network controller (RNC) $26_2$].

The second mode [e.g., FIG. 4B, FIG. 4B(1) and FIG. 4B(2)] is particularly useful when the Iur interface and signalling links are down and therefore, the SRNC messages can not be sent over Iur to DRNC. Thus, in the second mode the DRNC advantageously performs these procedures (paging/cell update prompting procedures).

In the second mode, the SRNC recovery unit $100_2$ of the DRNC node maintains a UE context database $102_{2B}$. The UE context database $102_{2B}$ includes entries for user equipment units which have connections controlled by the SRNC (i.e., radio network controller $26_1$) and which are in a critical state of the Connected Mode (e.g., the CELL_PCH state or the URA_PCH state). The content and example format of the UE context database $102_{2B}$ can be essentially the same as that previously described with reference to FIG. 2.

When the enhanced radio network controller (RNC) is a DRNC, the context information in database $102_{2B}$ further includes, among others, the following parameters: U-RNTI, IMSI, C-ID, D-RNTI, S-RNTI, SRNC Identity, and RL-ID. Various of these parameters have already been described above, and reference is hereby made to such previous description. The RL-ID parameter is an Identifiers of the Radio Links established for an user equipment unit (UE) in the DRNC. The RL-ID parameter is only applicable for an user equipment unit (UE) in the Cell_DCH state. When the enhanced radio network controller (RNC) is a DRNC, the entries in the UE context datebase $102_{2B}$ can be sorted or arranged by the D-RNTI (which can be included, for example, in the first field of a row [see FIG. 2]).

After reset of the SRNC, the DRNC initiates transmission of the cell update-prompting message to the user equipment unit. Whereas conventional paging of a user equipment unit is initiated at the SRNC which controls the connection with which the user equipment unit is involved, in the present invention the DRNC is authorized on its own accord and determination to initiate transmission of the cell update-prompting message. Moreover, while UE context information has formerly been kept at a DRNC for user equipment units in the CELL_DCH state and in the CELL_FACH state, the present invention has the DRNC store UE context information for user equipment units in the CELL_PCH state or the URA_PCH state.

The illustration of FIG. 1B is somewhat simplistic in showing only two RNC nodes. It can happen, for example, that the radio network controller $26_2$ may serve as a DRNC node for several differing SRNC nodes. In such case, the SRNC recovery unit $100_2$ of the DRNC node may maintains a UE context database for each such SRNC node, or otherwise have a way for distinguishing (within a common database) which particular RNC node serves as the SRNC node for a connection involving a user equipment unit listed in the database. When a certain SRNC node fails, the SRNC recovery unit $100_2$ thus must have a way of determining which user equipment units are involved in connections controlled by the failing SRNC node.

FIG. 4B shows certain basic example messages and events performed in conjunction with the second mode of FIG. 1B. As one optional aspect of the invention, the DRNC can address its cell update-prompting message individually to user equipment units which are affected by the failure of the SNRC. But to implement such individual addressing of the user equipment units, the DRNC must know the IMSI of the user equipment units in order to determine or compute a paging occasion at which to transmit the cell update-prompting message individually to each user equipment unit. Therefore, in order for the DRNC to obtain the IMSI for a user equipment unit to put on its UE context database $102_{2B}$ and use for such page timing purpose, FIG. 4B shows (in broken lines) as event 4B-1 the SRNC transmitting to the DNRC the IMSI for a user equipment unit which is in a critical state of the Connected Mode. Such transmission of the IMSI can occur, for example, using a Downlink (DL) Signalling Transfer Message (described in 3GPP TS 25.423).

Event 4B-2 shows the SRNC recovery unit $100_{2B}$ of the DRNC, e.g., radio network controller (RNC) $26_2$ in FIG. 1B, maintaining its UE context database $102_{2B}$. As explained above, the UE context database $102_{2B}$ stores the UE context (e.g., U-RNTI) for one or more user equipment units which have a connection controlled by the SRNC (e.g., radio network controller $26_1$) and which are in a critical state of the Connected Mode for which the DRNC controls the cells utilized by the radio connection with user equipment unit (UE) 30.

Event 4B-3 depicts, at the SRNC (e.g., radio network controller (RNC) $26_1$), a loss of context for at least some of the user equipment units having radio connections controlled by the SRNC, followed by attempted recovery. As in the case of the first mode of FIG. 1A, such loss of context typically means loss of the U-RNTI for the respective user equipment units, and generally occurs during failure of the SRNC node.

Upon detection by the DRNC of the failure and attempted recovery of the SRNC (such detection being depicted as event 4B-4), the DRNC transmits (as event 4B-5) the cell update-prompting message to the affected user equipment unit (UE) 30. The UE context information (e.g., U-RNTIs) for failure-affected user equipment unit(s) is obtained from the UE context database $102_{2B}$, and such UE context information is used to address the cell update-prompting message to the failure-affected user equipment unit(s).

Upon receipt of the cell update-prompting message of event 4B-5, as event 4B-6 the user equipment unit (UE) initiates a cell update procedure. As in the case of the first mode, when the user equipment unit (UE) is in the CELL_PCH state, the cell update procedure is a cell update procedure. On the other hand, when the user equipment unit (UE) is in the URA_PCH state, the cell update procedure is a URA update procedure.

Upon completion of the cell update procedure (e.g., event 4B-6), the SRNC can page the user equipment unit (UE) 30 in conventional manner using the U-RNTI of the user equipment unit (UE). Such paging of the user equipment unit (UE) 30 is depicted by a two step event labeled as event 4B-7 in FIG. 4B, the paging message being first transmitted from the SRNC to the DRNC, and then from the DRNC via an appropriate base station to the user equipment unit (UE) 30. For event 4B-7, the DRNC essentially relays the SRNC-initiated paging message to the user equipment unit. Such relay of a message is an entirely different matter than DRNC-initiation of the cell update-prompting message of the present invention.

The SRNC recovery preparatory unit $100_{1B}$ of the second mode can perform other functions, including the functions of RNC recovery unit $100_1$ as described in the first mode of FIG. 1A and FIG. 4A with respect to connections with user equipment units in cells controlled by the SRNC.

As in the first mode, in the second mode of FIG. 1B and FIG. 4B the cell update-prompting message can take various forms. FIG. 4B(1) and FIG. 4B(2) specifically illustrate examples of particular message types in conjunction with the second mode of FIG. 1B and FIG. 4B. For example, FIG. 4B(1) shows that the cell update-prompting message of event 4B-5 can take the form of a paging message (see event 4B(1)-5 in FIG. 4B(1)). FIG. 4B(2) shows that the cell update-prompting message of event 4B-5 can, as an alternative, take the form of a radio resource control (RRC) system information broadcast message (see event 4B(2)-5 in FIG. 4B(2)).

Although FIG. 4A and FIG. 4B and related figures do not expressly show a radio base station, the person skilled in the art will understand (particularly with reference to respective FIG. 1A and FIG. 1B) that radio transmissions from the RNC nodes occur via the appropriate radio base station nodes of the UTRAN.

Figure 5:
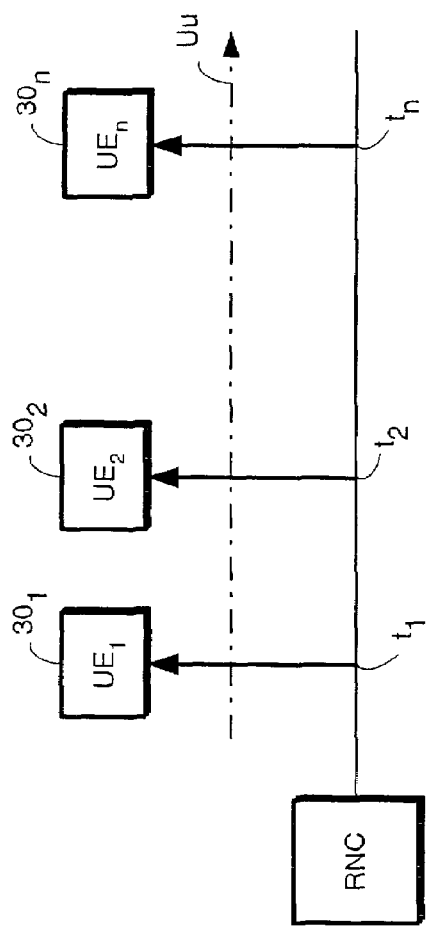
FIG. 5 is a timing diagram showing transmission of separate cell update-prompting messages to plural user equipment units in accordance with various modes of the invention.

The manner of transmission/broadcast of the cell update-prompting message (in any of its forms) can also vary. For example, as illustrated in FIG. 5, the cell update-prompting message can be transmitted individually to plural user equipment units in a critical state of the Connected Mode. When the cell update-prompting message is transmitted individually, the U-RNTI of the user equipment unit (UE)s is employed for addressing the cell update-prompting message. That is, a series of cell update-prompting messages can be transmitted from the RNC at successive time periods. For example, FIG. 5 shows a first cell update-prompting message being transmitted to user equipment unit (UE) $30_1$ at time $t_1$, a second cell update-prompting message being transmitted to user equipment unit (UE) $30_2$ at time $t_2$, and so forth continuing to time $t_n$ for user equipment unit (UE) $30_n$.

The RNC shown in FIG. 5 can be either a SRNC or SRNC/CRNC in the manner of the first mode of FIG. 1A and FIG. 4A, or a DRNC in the manner of the second mode of FIG. 1B and FIG. 4B. When the RNC shown in FIG. 5 is a SRNC or SRNC/CRNC, recovery of the UE context information requires that the UE context database 102 be maintained in involatile memory or is otherwise recoverable after the failure of the SRNC.

The determination of the particular times, e.g., $t_1$, $t_2$, ..., etc., at which to transmit the cell update-prompting message to the corresponding user equipment units is facilitated by the context-enhanced RNC knowing the IMSI for the user equipment units which are affected by the loss of context. The IMSI is utilized by the context-enhanced RNC to determine a paging occasion for the user equipment unit, e.g., to determine a point in time at which the user equipment unit will listening to a paging channel. As shown in FIG. 2, the IMSI can optionally be stored in the database of the context-enhanced RNC node. As mentioned above, in order for a context-enhanced DRNC to obtain the IMSI for a user equipment unit on its list, the SRNC transmits to the DNRC the IMSI for a user equipment unit which is in a critical state of its Connected Mode. Such transmission of the IMSI from the SRNC to the DRNC can occur, for example, using a Downlink (DL) Signalling Transfer Message.

Figure 6:
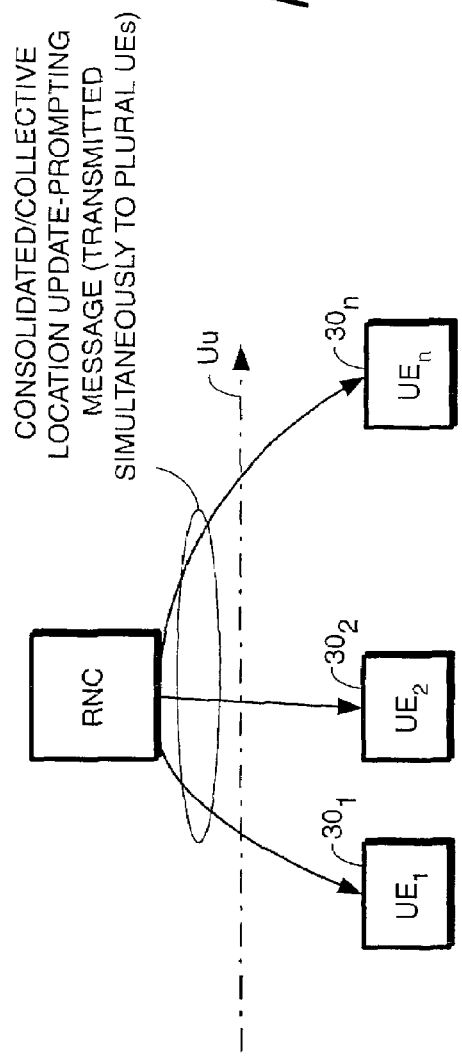
FIG. 6 is a diagrammatic view showing transmission of consolidated cell update-prompting messages to plural user equipment units in accordance with various modes of the invention.

Alternatively, the cell update-prompting message can be transmitted collectively to plural user equipment units in a critical state of the Connected Mode in the manner generally illustrated in FIG. 6. FIG. 6 particularly shows the cell update-prompting message being transmitted in consolidated or collection fashion (e.g., essentially simultaneously) to each of plural user equipment units (UEs), e.g., to user equipment unit (UE) $30_1$ through user equipment unit (UE) $30_n$.

The plural user equipment units to which the cell update-prompting message pertains can be addressed using the SRNC identity of the failed RNC, or a group address is associated with the plural user equipment units. Such group address can be formed, for example, using the SRNC identity of the failed SRNC and selected bits of a S-RNTI information element. Currently, the information element known as the U-RNTI consists of a first information element (IE) known as the SRNC Identity [SRNC-id] (which is 12 bits), and a second information element (IE) known as the S-RNTI (which is 20 bits). The SRNC-id occupies the most significant bits of the U-RNTI. The SRNC-id information element is typically an identifier of the SRNC which serves the user equipment unit (UE). The S-RNTI information element is a number allocated by that SRNC for distinguishing the user equipment unit (UE) within that SRNC.

The RNC shown in FIG. 6 can also be either a SRNC or SRNC/CRNC in the manner of the first mode of FIG. 1A and FIG. 4A, or a DRNC in the manner of the second mode of FIG. 1B and FIG. 4B. When the user equipment units are addressed with a group identity (SRNC-ID) or SRNC-ID+ some bits of the SRNTIs, an involatile memory is not necessarily required since it is not necessary to recover the addresses of individual user equipment unit (UE)s, but rather the SRNC-id or SRNC-id+some bits of SRNTI are used to address the all user equipment unit (UE)s.

The RNC shown in FIG. 5 is a SRNC or SRNC/CRNC, recovery of the UE context information requires that the UE context database 102 be maintained in involatile memory or is otherwise recoverable after the failure of the SRNC.

Figure 7:
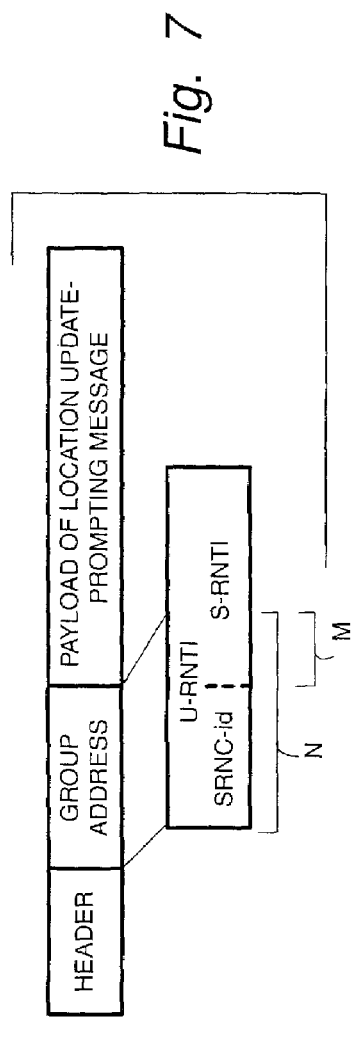
FIG. 7 is a diagrammatic view of a format of a example consolidated cell update-prompting message.

FIG. 7 shows an addressing technique in which, in addition to the SRNC Identity, some extra bits of the S-RNTI bits are also used. For example, the address field of the cell update-prompting message of FIG. 7 uses the N most significant bits (MSB) of the U-RNTI, where the $N \geq 12$. This is addressing technique is particularly beneficial for grouping and addressing the user equipment units which have common values in the first M number of bits of their S-RNTI.

In a situation such as that illustrated in FIG. 6 wherein the cell update-prompting message is repetitively transmitted to at least some of the plural user equipment units in a critical state of their Connected Mode; as one aspect of the invention the cell update-prompting message can include a field which facilitates a user equipment unit performing its cell update only once despite possible plural receptions by the user equipment unit of the cell update-prompting message. Inclusion of the field effectively serves as a cell update repetition prevention technique.

Figure 8:
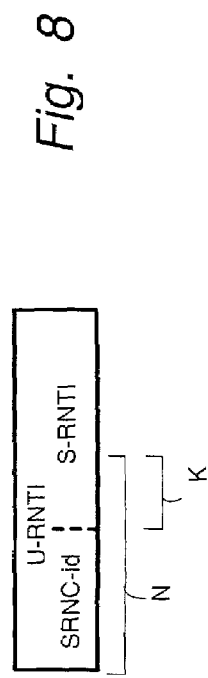
FIG. 8 is a diagrammatic view of an example consolidated cell update-prompting message using a first update repetition prevention technique.

FIG. 8 represents a first example technique for cell update repetition prevention. In accordance with the technique of FIG. 8, the idea is to reserve some S-RNTI's to be used during the RNC restart, so that when the user equipment unit performs its cell update, the S-RNTI within the reserved range is allocated to the user equipment unit and sent to the user equipment unit in a Cell Confirm message. Afterwards, when going back to the normal situation, the S-RNTI is reallocated by the RNC and moved backed to unreserved range. The SRNTI re-allocation mechanism itself does exits in current specifications.

The "S-RNTI Reserved range" is known by the SRNC (e.g. defined through Operation and maintenance by an operator). The S-RNTIs within the reserved range are not used during the normal operation (i.e., when everything is working fine and there is no RNC reset/recovery in process). For instance if K=4 most significant bits (MSBs) of the S-RNTI information element (which has a total 20 bits) is reserved, then out of ($2^{20}$) possible S-RNTI values, only ($2^{16}$) S-RNTI values are allowed to be used during the normal operation, i.e. ($2^{20}$) minus ($2^{16}$) values are reserved and therefore are not used by the SRNC for any UE. When the SRNC resets, the user equipment unit (UE) (which previously had a S-RNTI within the unreserved range) starts sending a cell update message to the SRNC. The SRNC receives the cell update message and then re-asigns (e.g., re-allocates) to the user equipment unit (UE) a S-RNTI value within the reserved range, and send this reassigned, reserved range S-RNTI value in the response message (e.g., Cell Update Confirm message) to the user equipment unit (UE). After the SRNC has recovered and gets back into normal operation, the SRNC pages the user equipment units (UEs) one by one (or upon the normal cell update) and re-allocates the S-RNTI which is within the reserved range back into the unreserved range.

Figure 9:
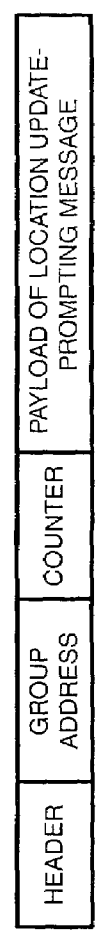
FIG. 9 is a diagrammatic view of an example consolidated cell update-prompting message using a second update repetition prevention technique.
Figure 11:
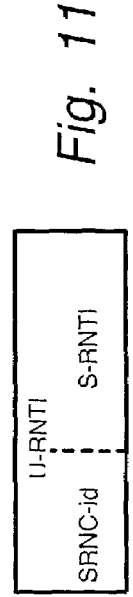
FIG. 11 is a diagrammatic view showing composition of a UTRAN Identity (U-RNTI).
Figure 10:
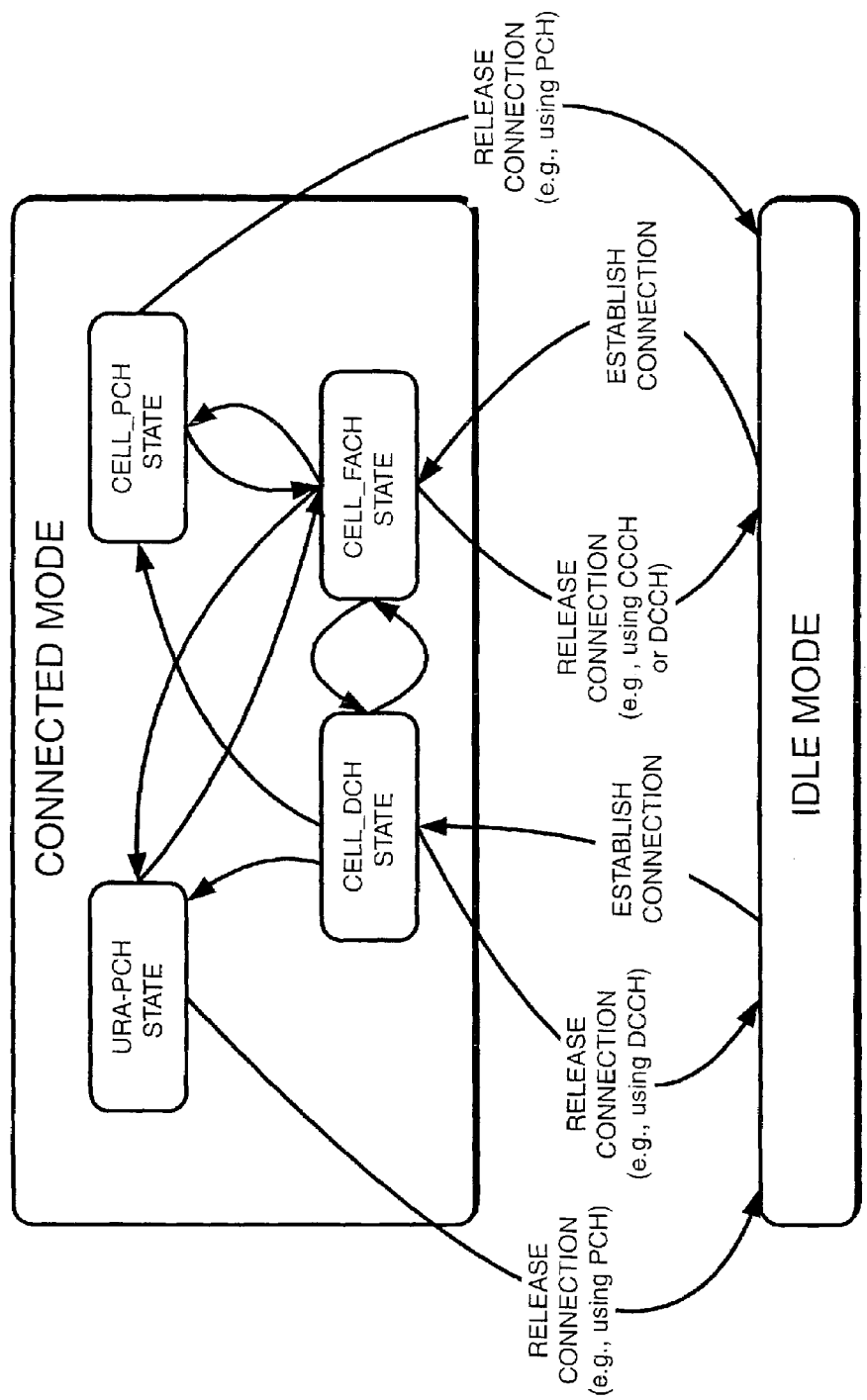
FIG. 10 is a diagrammatic view showing modes and states of a user equipment unit (UE) pertinent to the present invention.

As a second example, the cell update repetition prevention field can comprise a value tag or counter such as that denoted by field "COUNTER" in the example format of the cell update-prompting message shown in FIG. 9. After the user equipment unit has been addressed by the cell update-prompting message containing a certain value for the counter and has performed its cell update, the user equipment unit does not respond (e.g., does not perform any further cell updates) to further transmissions of the cell update-prompting message in which the value tag or counter is unchanged. On the other hand, upon a further reception of the cell update-prompting message, if the value of the counter has changed since a previous reception of the cell update-prompting message, the user equipment unit must perform its cell update procedure.

As a variation of the technique of FIG. 9, it is possible to address the user equipment units with a group identity. For instance, if the all the user equipment units within a group are affected, then only these are addressed using this group identity. This is for the implementation scenarios when the RNC may be implemented by different hardware processors and the a certain S-RNTI range is allocated for each of the hardware entities. The group identity will be the N number of most significant bits of the U-RNTI, where N≧16. In the FIG. 9 technique, it is not the S-RNTI range that is not intended to solve the repetitive cell update problem, but rather it is the value tag (e.g., the counter) which solves the repetition transmission problem.

Thus, in its broad aspects the present invention prompts a user equipment unit (UE) to perform a cell update in order to update the UE context information. Alternatively, if cell update is not possible (e.g., it is not possible to recover after RNC failure), the user equipment unit (UE) transitions to Idle mode by releasing the RRC connection.

It should be understood that various modes and scenarios above described can be combined. For example, in the case of SRNC failure in the second mode of FIG. 1B and FIG. 4B, in the manner of FIG. 5 the DRNC (e.g., radio network controller (RNC) $26_2$) can page the individual user equipment units (UE) 30 one by one to initiate the cell update procedure. As explained previously, for this solution the UE context information shall be kept in the DRNC (e.g., in UE context database $102_{2B}$) for the user equipment units which are in a critical state of the Connected Mode. As further explained above, the DRNC uses the IMSI of the user equipment unit (UE) (which can be stored in context database $102_{2B}$ or elsewhere at the DRNC node) in order to determine the paging occasion and thereby known when to transmit the cell update-prompting message. Therefore, the IMSI is expressly made available to the DRNC, e.g. by transfering the IMSI to the DRNC using the DL Signalling Transfer message in accordance with 3GPP TS 25.423 as described above. This ensures that the IMSI will always be available in the DRNC at the event of the SRNC failure.

In the case of SRNC failure in the second mode of FIG. 1B and FIG. 4B, in the manner of FIG. 6 the DRNC (e.g., radio network controller (RNC) $26_2$) can send a paging message, or any other new message on Uu interface, to all affected user equipment units addressing by the SRNC identity. In order to avoid successive cell updates by a user equipment unit (UE) due to continuous or repeated transmission of the paging message, various cell update repetition prevention formats can be utilized for the cell update-prompting message, as exemplified with reference to FIG. 8 and FIG. 9.

The present invention thus advantageously resolves problems of the user equipment units a critical state of the Connected Mode (e.g., in the CELL_PCH state and the URA_PCH state) not being reached after an RNC failure for a long period of time. If cell update is not possible (e.g., it is not possible to recover after RNC failure), the user equipment unit (UE) transitions to Idle mode by releasing the RRC connection. Example ways of releasing the RRC connection are explained in U.S. patent application Ser. No. 09/852,915 filed May 11, 2001, entitled RELEASING PLURAL RADIO CONNECTION WITH OMNIBUS RELEASE MESSAGE, which is incorporated by reference herein in its entirety.

Figure 3:
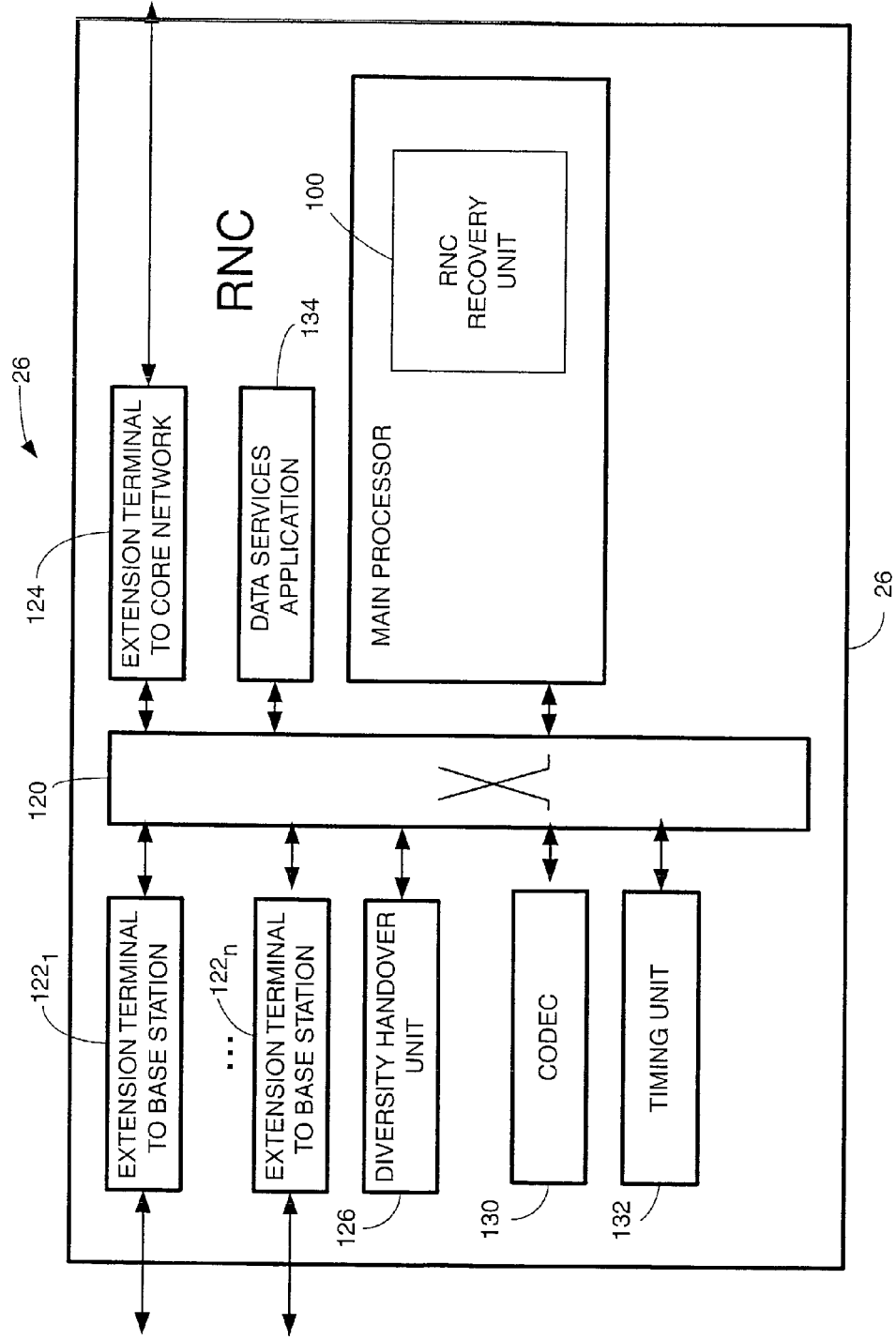
FIG. 3 is a schematic view of an example RNC node in accordance with one example embodiment of the invention.

FIG. 3 illustrates, in somewhat more detail, an example non-limiting RNC node 26 of the present invention. It so happens that the RNC node 26 of FIG. 3 is a switched-based node having a switch 120. The switch 120 serves to interconnect other constituent elements of RNC node 26. Such other constituent elements include extension terminals $122_1$ through $122_n$, as well as extension terminal 124. Extension terminals $122_1$ through $122_n$ essentially function to connect RNC node 26 to the base stations 28 served by RNC node 26; extension terminal 124 connects RNC node 26 across the Iu interface to the core network.

Yet other constituent elements of RNC node 26 include diversity handover unit 126; codec 130; timing unit 132; a data services application unit 134; and, a main processor 140. The person skilled in the art will appreciate generally the functions of these constituent elements. While in FIG. 2 and FIG. 3 the RNC recovery unit 100 is generally shown as being performed by either the data processing and control function (or more particularly in FIG. 3 by main processor 140), it should be understood that the functions of RNC recovery unit 100 can be implemented using individual hardware circuits, using software functioning in conjunction with a suitably programmed digital microprocessor or general purpose computer, using an application specific integrated circuit (ASIC), and/or using one or more digital signal processors (DSPs).

As used herein, a "critical state" of the Connected Mode can be any state which, upon failure of an RNC, would essentially render a user equipment unit as a hanging user equipment unit (e.g., unable to be paged) for any period of time. While the CELL_PCH state and the URA_PCH state have been cited as examples of such critical state, the invention is not limited or confined particularly to these states.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of operating a radio access network which includes a radio network controller (RNC) node, the method comprising:
   (1) storing, at the radio network controller (RNC) node, context information for a user equipment unit in a Connected Mode; and
   (2) initiating, at the radio network controller (RNC) node, repetitive transmission of a cell update-prompting message to at least some of plural user equipments in the Connected Mode and including in the the cell update-prompting message a cell update repetition prevention field which facilitates a user equipment unit performing its cell update only once despite possible plural receptions by the user equipment unit of the cell update-prompting message.

2. The method of claim 1, wherein the cell update-prompting message is a paging message.

3. The method of claim 1, wherein the cell update-prompting message is a radio resource control (RRC) system information broadcast message.

4. The method of claim 1, further comprising transmitting the cell update-prompting message to the user equipment unit which is in a CELL_PCH state or a URA_PCH state of the Connected Mode.

5. The method of claim 1, wherein the cell update-prompting message is transmitted individually to the plural user equipment units in the Connected Mode.

6. The method of claim 5, further comprising:
   storing at the radio network controller (RNC) node the international mobile subscriber identity (IMSI) of the user equipment unit; and using the international mobile subscriber identity (IMSI) of the user equipment unit to determine a transmission occasion for the cell update-prompting message.

7. The method of claim 1, further comprising:
including in the cell update repetition prevention field of the cell update-prompting message a counter associated with a particular cell update request; and
the user equipment unit ignoring all but first receptions of a cell update-prompting message having a same content in the counter.

8. The method of claim 1, wherein step (1) and step (2) are performed to recover from at least partial loss, at the radio network controller (RNC) node, of context information for a user equipment unit.

9. The method of claim 8, wherein the context information for the user equipment unit comprises a UTRAN Radio Network Temporary Identity (U-RNTI) for the user equipment unit.

10. The method of claim 8, wherein the radio network controller (RNC) node which suffers the loss of context information for a user equipment unit is a Serving RNC (SRNC) node, the method further comprising:
the SRNC node maintaining a list of user equipment units in a critical state of the Connected Mode and storing the IMSI for the user equipment units on the list; and
the SRNC transmitting the cell update-prompting message to the user equipment unit.

11. The method of claim 8, wherein the radio network controller (RNC) node which suffers the loss of context information for a user equipment unit is a Serving RNC (SRNC) node, the method further comprising:
a drift RNC (DRNC) node maintaining a list of user equipment units which have radio access connections controlled by the SRNC and which are in a critical state of the Connected Mode;
the DRNC initiating transmission of the cell update-prompting message to the user equipment unit.

12. The method of claim 11, further comprising:
the SRNC transmitting to the DNRC the IMSI for a user equipment unit which is in the Connected Mode;
the DRNC using the international mobile subscriber identity (IMSI) of the user equipment unit to determine a transmission occasion for the cell update-prompting message.

13. The method of claim 12, further comprising the SRNC transmitting to the DNRC the IMSI for a user equipment unit which is in the Connected Mode in a Downlink (DL) Signalling Transfer Message.

14. The method of claim 1, further comprising
the user equipment unit which is in the Connected Mode performing a cell update procedure; and
subsequently paging the user equipment unit which is in the Connected Mode with the UTRAN Radio Network Temporary Identity (U-RNTI) for the user equipment unit.

15. A method of recovery from at least partial loss, at a serving radio network controller (SRNC) node of a radio access network, of context information including a UTRAN Radio Network Temporary Identity (U-RNTI) for a user equipment unit a Connected Mode, the method comprising:
storing, at a drift radio network controller (DRNC) node of the radio access network, the context information for the user equipment unit in a Connected Mode; and
initiating, at the drift radio network controller (DRNC) node, repetitive transmission of a cell update-prompting message to at least some of plural user equipments in the Connected Mode and including in the cell update-prompting message a cell update repetition prevention field which facilitates a user equipment unit performing its cell update only once despite possible plural receptions by the user equipment unit of the cell update-prompting message.

16. The method of claim 15, wherein the cell update-prompting message is a paging message.

17. The method of claim 15, wherein the cell update-prompting message is a radio resource control (RRC) system information broadcast message.

18. The method of claim 15, further comprising transmitting the cell update-prompting message to the user equipment unit in a CELL_PCH state or a URA_PCH state of the Connected Mode.

19. The method of claim 15, wherein the cell update-prompting message is transmitted individually to the plural user equipment units in the Connected Mode.

20. The method of claim 19, further comprising:
storing at the drift radio network controller (DRNC) node the international mobile subscriber identity (IMSI) of the user equipment unit; and
using the international mobile subscriber identity (IMSI) of the user equipment unit to determine a transmission occasion for the cell update-prompting message.

21. The method of claim 20, further comprising the SRNC transmitting to the DNRC the IMSI for a user equipment unit which is in the Connected Mode.

22. The method of claim 21, further comprising the SRNC transmitting to the DNRC the IMSI for a user equipment unit which is in the Connected Mode in a Downlink (DL) Signalling Transfer Message.

23. The method of claim 15, further comprising:
including in the cell update repetition prevention field of the cell update-prompting message a counter associated with a particular cell update request; and
the user equipment unit ignoring all but first receptions of a cell update-prompting message having a same content in the counter.

24. The method of claim 15, further comprising
the user equipment unit which is in the Connected Mode performing a cell update procedure; and
the SRNC subsequently paging the user equipment unit which is in the Connected Mode with the UTRAN Radio Network Temporary Identity (U-RNTI) for the user equipment unit.

25. The method of claim 15, wherein the context information includes a UTRAN Radio Network Temporary Identity (U-RNTI) for the user equipment unit a Connected Mode.

26. A radio access network which includes a radio network controller (RNC) node which stores context information for a user equipment unit in a Connected Mode and which initiates repetitive transmission of a cell update-prompting message to at least some of plural user equipments in the Connected Mode and including in the cell update-prompting message a cell update repetition prevention field which facilitates a user equipment unit performing its cell update only once despite possible plural receptions by the user equipment unit of the cell update-prompting message.

27. The network of claim 26, wherein the cell update-prompting message is a paging message.

28. The network of claim 26, wherein the cell update-prompting message is a radio resource control (RRC) system information broadcast message.

29. The network of claim 26, wherein the cell update-prompting message is transmitted to the user equipment unit in a CELL_PCH state or a URA_PCH state of the Connected Mode.

30. The network of claim 26, wherein the cell update-prompting message is transmitted individually to the plural user equipment units in the Connected Mode.

31. The network of claim 30, wherein the radio network controller (RNC) node stores the international mobile subscriber identity (IMSI) of the user equipment unit uses the international mobile subscriber identity (IMSI) of the user equipment unit to determine a transmission occasion for the cell update-prompting message.

32. The network of claim 26, wherein the cell update repetition prevention field of the cell update-prompting message has a counter associated with a particular cell update request; and wherein the user equipment unit ignores all but first receptions of a cell update-prompting message having a same content in the counter.

33. The network of claim 26, wherein the radio network controller (RNC) node transmits the cell update-prompting message in conjunction with recovery from at least partial loss, at the radio network controller (RNC) node, of context information for a user equipment unit.

34. The network of claim 33, wherein the context information for the user equipment unit comprises a UTRAN Radio Network Temporary Identity (U-RNTI) for the user equipment unit.

35. The network of claim 33, wherein the radio network controller (RNC) node which suffers the loss of context information for a user equipment unit is a Serving RNC (SRNC) node;
wherein the SRNC node maintains a list of user equipment units in the a critical state of the Connected Mode and stores context information for the user equipment units on the list; and
wherein the SRNC transmits the cell update-prompting message to the user equipment unit.

36. The network of claim 33, wherein the radio network controller (RNC) node which suffers the loss of context information for a user equipment unit is a Serving RNC (SRNC) node;
wherein the radio access network further comprises a drift RNC (DRNC) node which maintains a list of user equipment units which have radio access connections controlled by the SRNC and which are in a critical state of the Connected Mode; and
wherein the DRNC initiates transmits the cell update-prompting message to the user equipment unit.

37. The network of claim 36, wherein the DRNC node stores the IMSI for the user equipment units on the list and uses the international mobile subscriber identity (IMSI) of the user equipment unit to determine a transmission occasion for the cell update-prompting message.

38. The network of claim 37, wherein the SRNC transmits to the DNRC the IMSI for a user equipment unit which is in the Connected Mode.

39. The network of claim 38, wherein the SRNC transmits to the DNRC the IMSI for a user equipment unit which is in the Connected Mode in a Downlink (DL) Signalling Transfer Message.

40. The network of claim 26, wherein
the user equipment unit which is in the Connected Mode performs a cell update procedure; and
wherein the RNC node subsequently pages the user equipment unit which is in the Connected Mode with the UTRAN Radio Network Temporary Identity (U-RNTI) for the user equipment unit.

41. A radio network controller (RNC) node of a radio access network, the radio network controller (RNC) node storing context information for a user equipment unit in a Connected Mode and initiating repetitive transmission of a cell update-prompting message to at least some of plural user equipments in the Connected Mode and including in the cell update-prompting message a cell update repetition prevention field which facilitates a user equipment unit performing its cell update only once despite possible plural receptions by the user equipment unit of the cell update-prompting message.

42. The controller of claim 41, wherein the cell update-prompting message is a paging message.

43. The controller of claim 41, wherein the cell update-prompting message is a radio resource control (RRC) system information broadcast message.

44. The controller of claim 41, wherein the cell update-prompting message is transmitted to the user equipment unit in a CELL_PCH state or a URA_PCH state of the Connected Mode.

45. The controller of claim 41, wherein the cell update-prompting message is transmitted individually to the plural user equipment units in the Connected Mode.

46. The controller of claim 41, wherein the radio network controller (RNC) node stores the international mobile subscriber identity (IMSI) of the user equipment unit uses the international mobile subscriber identity (IMSI) of the user equipment unit to determine a transmission occasion for the cell update-prompting message.

47. The controller of claim 41, wherein the cell update repetition prevention field of the cell update-prompting message has a counter associated with a particular cell update request; and wherein the user equipment unit ignores all but first receptions of a cell update-prompting message having a same content in the counter.

48. The controller of claim 41, wherein the radio network controller (RNC) node transmits the cell update-prompting message in conjunction with recovery from at least partial loss, at the radio network controller (RNC) node, of context information for a user equipment unit.

49. The controller of claim 48, wherein the context information for the user equipment unit comprises a UTRAN Radio Network Temporary Identity (U-RNTI) for the user equipment unit.

50. The apparatus of claim 48, wherein the radio network controller (RNC) node which suffers the loss of context information for a user equipment unit is a Serving RNC (SRNC) node;
wherein the SRNC node maintains a list of user equipment units in a critical state of the Connected Mode and stores the context information for the user equipment units on the list; and
wherein the SRNC transmits the cell update-prompting message to the user equipment unit.

51. The controller of claim 48, wherein the radio network controller (RNC) node which suffers the loss of context information for a user equipment unit is a Serving RNC (SRNC) node;
wherein the radio access network further comprises a drift RNC (DRNC) node which maintains a list of user equipment units which have radio access connections controlled by the SRNC and which are in a critical state of the Connected Mode; and
wherein the DRNC initiates transmits the cell update-prompting message to the user equipment unit.

52. The controller of claim 51, wherein the DRNC node stores the IMSI for the user equipment units on the list and uses the international mobile subscriber identity (IMSI) of the user equipment unit to determine a transmission occasion for the cell update-prompting message.

53. The controller of claim 52, wherein the SRNC transmit to the DNRC the IMSI for a user equipment unit which is in the Connected Mode.

54. The controller of claim 53, wherein the SRNC transmits to the DNRC the IMSI for a user equipment unit which is in the Connected Mode in a Downlink (DL) Signalling Transfer Message.

55. The controller of claim 41, wherein the user equipment unit which is in a critical state of the Connected Mode performs a cell update procedure; and wherein the RNC node subsequently pages the user equipment unit which is the Connected Mode with the UTRAN Radio Network Temporary Identity (U-RNTI) for the user equipment unit.

* * * * *